(12) United States Patent
Moy et al.

(10) Patent No.: US 12,379,730 B2
(45) Date of Patent: *Aug. 5, 2025

(54) METHODS AND SYSTEMS FOR FLIGHT CONTROL CONFIGURED FOR USE IN AN ELECTRIC AIRCRAFT

(71) Applicant: BETA AIR, LLC, South Burlington, VT (US)

(72) Inventors: Nicholas Moy, Burlington, VT (US); Joshua E. Auerbach, Waterbury Center, VT (US)

(73) Assignee: BETA AIR LLC, South Burlington, VT (US)

( * ) Notice: Subject to any disclaimer, the term of this patent is extended or adjusted under 35 U.S.C. 154(b) by 386 days.

This patent is subject to a terminal disclaimer.

(21) Appl. No.: 17/478,143

(22) Filed: Sep. 17, 2021

(65) Prior Publication Data
US 2022/0326704 A1 Oct. 13, 2022

Related U.S. Application Data

(63) Continuation-in-part of application No. 17/218,428, filed on Mar. 31, 2021, now Pat. No. 11,524,767.

(51) Int. Cl.
*G05D 1/00* (2024.01)
*B64D 27/24* (2024.01)
(Continued)

(52) U.S. Cl.
CPC ........... *G05D 1/0011* (2013.01); *B64D 27/24* (2013.01); *B64D 31/06* (2013.01); *G05D 1/0808* (2013.01)

(58) Field of Classification Search
CPC .. G05D 1/0011; G05D 1/0808; G05D 1/0055; G05D 1/0858; B64D 27/24; B64D 31/06
See application file for complete search history.

(56) References Cited

U.S. PATENT DOCUMENTS 4,236,685 A 12/1980 Kissel
5,559,415 A 9/1996 Gregory
(Continued)

FOREIGN PATENT DOCUMENTS

CN 207274974 U 4/2018
CN 110647160 A * 1/2020
(Continued)

OTHER PUBLICATIONS

Retrieved from the internet at: https://www.mdpi.com/2226-4310/6/38/pdf Title: Non-Linear Dynamic Inversion Control Design for Rotorcraft Date: Mar. 18, 2019 by: Joseph F. Horn.
(Continued)

*Primary Examiner* — Hunter B Lonsberry
*Assistant Examiner* — Jalal C Coduroglu
(74) *Attorney, Agent, or Firm* — Lee & Hayes, P.C.

(57) ABSTRACT

A system for flight control configured for use in an electric aircraft includes an inertial measurement unit (IMU) and configured to detect an aircraft angle and an aircraft angle rate. The system includes a flight controller including an outer loop controller configured to receive the input datum from the sensor, receive the aircraft angle from the IMU, and generate a rate setpoint as a function of the input datum. The system includes an inner loop controller configured to receive the aircraft angle rate, receive the rate setpoint from the outer loop controller, and generate a moment datum as a function of the rate setpoint. The system includes a mixer configured to receive the moment datum, perform a torque allocation as a function of the moment datum, and generate a motor command datum as a function of the torque allocation.

22 Claims, 8 Drawing Sheets

(51) Int. Cl.
    *B64D 31/06*         (2024.01)
    *G05D 1/08*          (2006.01)

(56) References Cited

U.S. PATENT DOCUMENTS

| | | | |
|---|---|---|---|
| 6,913,228 | B2 | 7/2005 | Lee |
| 8,548,648 | B2 | 10/2013 | Sahasrabudhe |
| 9,266,608 | B2 | 2/2016 | Sahasrabudhe |
| 10,120,662 | B1 * | 11/2018 | Furman .................... G06F 8/73 |
| 10,877,487 | B2 | 12/2020 | Irwin, III |
| 10,906,656 | B2 | 2/2021 | Gilliland |
| 10,988,248 | B2 * | 4/2021 | Mikić ................ B64C 29/0033 |
| 11,142,333 | B1 | 10/2021 | Richter |
| 11,383,829 | B2 | 7/2022 | Gillett |
| 11,420,534 | B1 | 8/2022 | Palombini et al. |
| 11,442,472 | B1 | 9/2022 | List et al. |
| 11,518,497 | B2 | 12/2022 | Spiegel |
| 11,560,225 | B2 | 1/2023 | Spiegel |
| 11,651,703 | B1 | 5/2023 | Hall |
| 11,694,569 | B2 | 7/2023 | Hall |
| 11,794,919 | B2 | 10/2023 | Wiegman |
| 11,897,626 | B2 | 2/2024 | Guthrie et al. |
| 11,958,590 | B2 | 4/2024 | Schreiber et al. |
| 12,088,077 | B1 | 9/2024 | Lohe et al. |
| 2007/0032951 | A1 * | 2/2007 | Tanenhaus ............ G01C 21/188 |
| | | | 702/151 |
| 2009/0266939 | A1 * | 10/2009 | Hanlon .................... B64C 13/46 |
| | | | 244/223 |
| 2012/0053735 | A1 * | 3/2012 | Tessier ...................... G05D 1/82 |
| | | | 700/275 |
| 2012/0258639 | A1 * | 10/2012 | Rolla ...................... B63H 23/10 |
| | | | 440/3 |
| 2016/0032866 | A1 | 2/2016 | Cameron |
| 2016/0221663 | A1 | 8/2016 | Landers |
| 2016/0236790 | A1 | 8/2016 | Knapp |
| 2016/0376003 | A1 * | 12/2016 | Feldman ................. B64C 31/02 |
| | | | 703/2 |
| 2017/0159574 | A1 | 6/2017 | Paul |
| 2017/0250628 | A1 | 8/2017 | Tian |
| 2017/0336808 | A1 | 11/2017 | Luo |
| 2018/0237148 | A1 * | 8/2018 | Hehn .................... G05D 1/0077 |
| 2018/0251207 | A1 | 9/2018 | Kim |
| 2018/0265190 | A1 * | 9/2018 | Fortenbaugh ......... B64C 13/503 |
| 2018/0292842 | A1 | 10/2018 | Yu |
| 2018/0362158 | A1 * | 12/2018 | Zhang .................. G05D 1/0016 |
| 2019/0002115 | A1 * | 1/2019 | Miller .................... B64D 31/06 |
| 2019/0004542 | A1 | 1/2019 | Kim |
| 2019/0155282 | A1 * | 5/2019 | Kim ........................ B64C 27/57 |
| 2019/0265729 | A1 | 8/2019 | Gillett |
| 2019/0329868 | A1 * | 10/2019 | Morrison ................ G01C 23/00 |
| 2020/0094982 | A1 * | 3/2020 | Saunders ............... B64D 31/06 |
| 2020/0103922 | A1 | 4/2020 | Nonami |
| 2020/0198618 | A1 * | 6/2020 | Nagasawa ......... B60W 50/0098 |
| 2020/0277080 | A1 * | 9/2020 | Wiegman .................. B60L 1/00 |
| 2020/0290742 | A1 | 9/2020 | Kumar |
| 2020/0333805 | A1 * | 10/2020 | English .................. G05D 1/654 |
| 2020/0398992 | A1 | 12/2020 | Morrison |
| 2021/0004003 | A1 * | 1/2021 | Gury ...................... G01S 17/933 |
| 2021/0291996 | A1 | 9/2021 | Bosma et al. |
| 2022/0194613 | A1 | 6/2022 | Lima et al. |
| 2022/0289363 | A1 | 9/2022 | Giroux et al. |
| 2022/0315205 | A1 * | 10/2022 | Moy ...................... B64D 27/34 |
| 2024/0182156 | A1 | 6/2024 | Schreiber et al. |
| 2024/0375768 | A1 | 11/2024 | Giroux et al. |

FOREIGN PATENT DOCUMENTS

| | | |
|---|---|---|
| EP | 3176406 A1 | 6/2017 |
| EP | 3370129 B1 | 9/2018 |
| EP | 3613671 B1 | 2/2020 |
| RU | 2247432 C2 | 4/2004 |
| RU | 2440915 C2 | 9/2010 |
| RU | 2678725 C2 | 10/2018 |
| WO | 2006113391 A2 | 10/2006 |
| WO | 2015180171 A1 | 12/2015 |
| WO | 2016193884 A1 | 12/2016 |
| WO | 2019212744 A1 | 11/2019 |
| WO | WO-2021035623 A1 * | 3/2021 |

OTHER PUBLICATIONS

Retrieved from the internet at: https://core.ac.uk/download/pdf/31237773.pdf Title: Design of Nonlinear Flight Controller for Fighter Aircraft Date: Mar. 15, 2014 by: Abhay A Pashikar.

Retrieved from the internet at: https://citeseerx.ist.psu.edu/viewdoc/download?doi=10.1.1.720.3224&rep=rep1&type=pdf Title: In4073 QR Controller Theory (2011-2012) Date: Feb. 2012 by: Arjan J.C. Van Gemund.

Abhay A Pashikar, "Design of Nonlinear Flight Controller for Fighter Aircraft," Retrieved from the internet at: https://core.ac.uk/download/pdf/31237773.pdf, Mar. 15, 2014.

Arjan J.C. Van Gemund, "In4073 QR Controller Theory (2011-2012)," Retrieved from the internet at: https://citeseerx.ist.psu.edu/viewdoc/download?, Feb. 2012.

Campa et al. (Jun. 2004). Design of control laws for maneuvered formation flight. In Proceedings of the 2004 American Control Conference vol. 3, Jun. 2004, pp. 2344-2349.

Horn, "Non-Linear Dynamic Inversion Control Design for Rotorcraft," Retrieved from the internet at: https://www.mdpi.com/2226-4310/6/3/38/pdf, Mar. 18, 2019.

Office Action for U.S. Appl. No. 17/478,143, mailed on Jan. 4, 2024, Moy, "Methods and Systems for Flight Control Configured for Use in an Electric Aircraft", 10 Pages.

Search Report and Written Opinion for International Application No. PCT/US2024/021272, Dated Jun. 19, 2024, 13 pages.

Barry et al., "In-Flight Simulators", IEEE, 1986, p. 10-16.

Estebe et al., "Power supply for a wireless sensor network: Airliner flight test case study", 2014, IEEE, p. 707-711.

Gilyard, "In-flight transport performance optimization: an experimental flight research program and an operational scenario", 1997, IEEE, p. 1-17.

Kulkarni et al., "On-Board Battery Monitoring and Prognostics for Electric-Propulsion Aircraft", IEEE, p. 1-12.

Lawhorn et al., "Electric Aircraft System Co-Simulation Including Body, Propeller, Propulsion, and Energy Storage Models", 2019, IEEE, p. 1-5.

Office Action for U.S. Appl. No. 17/478,143, Dated Aug. 1, 2024, Moy, "Methods and Systems for Flight Control Configured for Use in an Electric Aircraft", 16 pages.

Office Action for U.S. Appl. No. 18/600,498, mailed on Oct. 4, 2024, 12 pages.

Office Action for U.S. Appl. No. 18/439,170, dated Oct. 4, 2024, 8 pages.

Potteiger et al., "A dependable, prognostics-incorporated, N-S modular battery reconfiguration scheme with an application to electric aircraft", 2017, IEEE, p. 1-9.

Saha et al., "Battery health management system for electronic UAVs", 2011, IEEE, p. 1-9.

Treacy, "Flight Safety Issues of an All-Electric Aircraft", IEEE, 1984, p. 1-7.

Green et al., "A fixed-wing aircraft for hovering in caves, tunnels, and buildings", Proceedings of the 2006 American Control Conference 2006, IEEE, 2006, pp. 1092-1097.

Green et al., "A Hybrid MAV for Ingress and Egress of Urban Environments", IEEE Transactions on Robotics, vol. 25, No. 2, ,2009, pp. 253-263.

Kang et al., "Flight test results of automatic tilt control for small scaled tilt rotor aircraft", International Conference on Control, Automation and Systems, 2008, pp. 47-51.

Office Action for U.S. Appl. No. 18/097,072, mailed on Nov. 1, 2024, Richter, "System and Methods for Flight Control for an Electric Aircraft", 8 Pages.

Silva et al., "Control validation with software-in-the-loop for a fixed-wing vertical takeoff and landing unmanned aerial vehicle

(56) References Cited

OTHER PUBLICATIONS with multiple flight stages", 2019 Workshop on Communications in Critical Embedded Systems, IEEE, 2019, pp. 1222-1227.

* cited by examiner

METHODS AND SYSTEMS FOR FLIGHT CONTROL CONFIGURED FOR USE IN AN ELECTRIC AIRCRAFT

CROSS-REFERENCE TO RELATED APPLICATIONS

This application is a continuation in part of U.S. patent application Ser. No. 17/218,428, filed on Mar. 31, 2021, entitled "METHODS AND SYSTEMS FOR FLIGHT CONTROL CONFIGURED FOR USE IN AN ELECTRIC AIRCRAFT," which is incorporated by reference herein in its entirety.

FIELD OF THE INVENTION

The present invention generally relates to the field of electric aircraft control. In particular, the present invention is directed to methods and systems for flight control configured for use in an electric aircraft.

BACKGROUND

In electrically propelled vehicles, such as an electric vertical takeoff and landing (eVTOL) aircraft, it is essential to maintain the integrity of the aircraft until safe landing. In some flights, a component of the aircraft may experience a malfunction or failure which will put the aircraft in an unsafe mode which will compromise the safety of the aircraft, passengers and onboard cargo.

SUMMARY OF THE DISCLOSURE

In an aspect, a system for flight control configured for use in electric aircraft includes at least a sensor, at least a sensor configured to capture at least an input datum from a pilot, an inertial measurement unit, the inertial measurement unit configured to detect at least an aircraft angle and detect at least an aircraft angle rate. The system includes a flight controller including: an outer loop controller configured to: receive at least an input datum from at least a sensor, receive at least an aircraft angle from the inertial measurement unit, and generate a rate setpoint as a function of at least an input datum. The system includes an inner loop controller configured to: receive at least an aircraft angle rate, receive the rate setpoint from the outer loop controller, and generate a moment datum as a function of the rate setpoint. The system includes a mixer, the mixer configured to: receive the moment datum, perform a torque allocation as a function of the moment datum, and generate at least a motor command datum as a function of the torque allocation.

In another aspect, a method of flight control configured for use in electric aircraft includes capturing, at an at least a sensor, an input datum from a pilot, detecting, at the inertial measurement unit, at least an aircraft angle, detecting, at the inertial measurement unit, at least an aircraft angle rate, receiving, at the outer loop controller, at least an input datum from at least a sensor, receiving, at the outer loop controller, at least an aircraft angle from the inertial measurement unit, generating, at the outer loop controller, a rate setpoint as a function of at least an input datum, receiving, at the inner loop controller, at least an aircraft angle rate from the inertial measurement unit, receiving, at the inner loop controller, the rate setpoint from the outer loop controller, generating, at the inner loop controller, a moment datum as a function of the rate setpoint, receiving, at a mixer, the moment datum, perform, at the mixer, a torque allocation as a function of the moment datum, and generating, at the mixer, at least a motor command datum as a function of the torque allocation.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
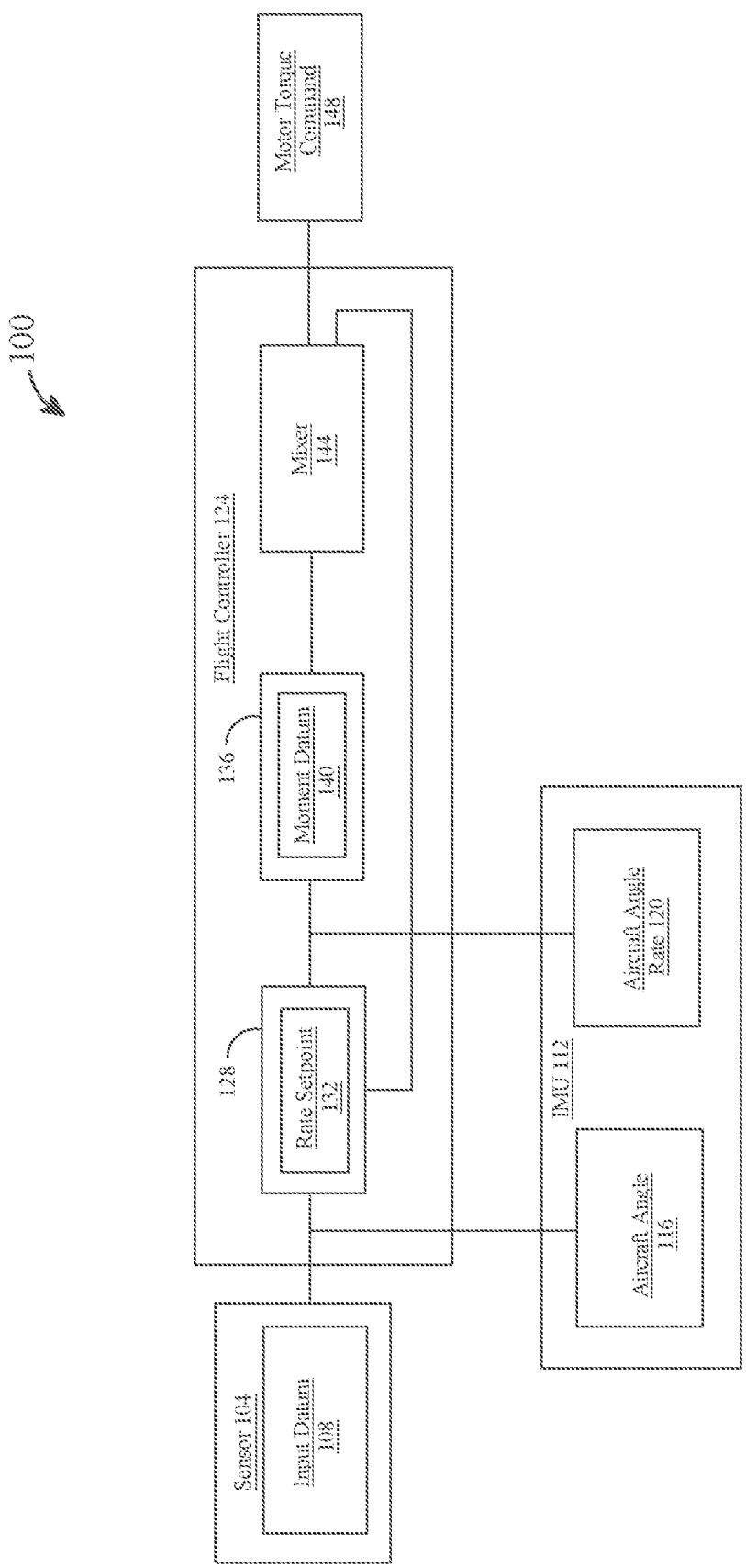
FIG. 1 is an illustrative embodiment of a system for flight control configured for use in embodiments of the present invention.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed a system for flight control configured for use in electric aircraft. System for flight control includes a sensor configured to capture an input datum from a pilot's interaction with a pilot control consistent with the entirety of this disclosure. The system includes an inertial measurement unit or one or more sensors configured to detect and/or measure one or more aircraft quantities such as an aircraft angle and an aircraft angle rate. The system includes one or more flight controllers, which may include an outer loop controller configured to control one or more aircraft angles by receiving at least an input datum from one or more sensors and at least an aircraft angle from the inertial measurement unit, and in turn generate a rate setpoint, the rate setpoint identifying a desired rate of change of one or more aircraft quantities like aircraft angle, as a function of at least an input datum. The system includes an inner loop controller configured to receive an aircraft angle rate, receive the rate setpoint from the outer loop controller, and generate a moment datum describing one or more moments/forces required to be applied to the aircraft in order to achieve the one or more commanded angles and rates, as a function of the rate setpoint. The system includes a mixer, the mixer configured to receive the moment datum, perform a torque allocation as a function of the moment datum, and generate a motor torque command datum as a function of the torque allocation.

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to embodiments oriented as shown for exemplary purposes in FIG. 6. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply embodiments of the inventive concepts defined in the appended claims. Hence, specific dimensions and other physical characteristics relating to the embodiments disclosed herein are not to be considered as limiting, unless the claims expressly state otherwise.

Referring now to FIG. 1, an exemplary embodiment of a flight control system 100 configured for use in electric aircraft is illustrated. Flight control system 100 includes a flight controller 124. Any component of flight control system 100 and/or flight controller 124 may include any computing device as described in this disclosure, including without limitation a microcontroller, microprocessor, digital signal processor (DSP) and/or system on a chip (SoC) as described in this disclosure. A computing device may include, be included in, and/or communicate with a mobile device such as a mobile telephone or smartphone. Flight control system 100 may include a single computing device operating independently, or may include two or more computing device operating in concert, in parallel, sequentially or the like; two or more computing devices may be included together in a single computing device or in two or more computing devices. Flight control system 100 may interface or communicate with one or more additional devices as described below in further detail via a network interface device. Network interface device may be utilized for connecting flight control system 100 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Flight control system 100 may include but is not limited to, for example, a computing device or cluster of computing devices in a first location and a second computing device or cluster of computing devices in a second location. Flight control system 100 may include one or more computing devices dedicated to data storage, security, distribution of traffic for load balancing, and the like. Flight control system 100 may distribute one or more computing tasks as described below across a plurality of computing devices of computing device, which may operate in parallel, in series, redundantly, or in any other manner used for distribution of tasks or memory between computing devices. Flight control system 100 may be implemented using a "shared nothing" architecture in which data is cached at the worker, in an embodiment, this may enable scalability of flight control system 100 and/or computing device.

With continued reference to FIG. 1, flight control system 100 and/or flight controller may be designed and/or configured to perform any method, method step, or sequence of method steps in any embodiment described in this disclosure, in any order and with any degree of repetition. For instance, Flight control system 100 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight control system 100 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1 flight control system 100 and/or flight controller may be controlled by one or more Proportional-Integral-Derivative (PID) algorithms driven, for instance and without limitation by stick, rudder and/or thrust control lever with analog to digital conversion for fly by wire as described herein and related applications incorporated herein by reference. A "PID controller", for the purposes of this disclosure, is a control loop mechanism employing feedback that calculates an error value as the difference between a desired setpoint and a measured process variable and applies a correction based on proportional, integral, and derivative terms; integral and derivative terms may be generated, respectively, using analog integrators and differentiators constructed with operational amplifiers and/or digital integrators and differentiators, as a non-limiting example. A similar philosophy to attachment of flight control systems to sticks or other manual controls via pushrods and wire may be employed except the conventional surface servos, steppers, or other electromechanical actuator components may be connected to the cockpit inceptors via electrical wires. Fly-by-wire systems may be beneficial when considering the physical size of the aircraft, utility of for fly by wire for quad lift control and may be used for remote and autonomous use, consistent with the entirety of this disclosure. Flight control system 100 may harmonize vehicle flight dynamics with best handling qualities utilizing the minimum amount of complexity whether it be additional modes, augmentation, or external sensors as described herein.

With continued reference to FIG. 1, flight control system 100 includes at least a sensor 104. At least a sensor 104 may be mechanically and communicatively connected to one or more throttles. The throttle may be any throttle as described herein, and in non-limiting examples, may include pedals, sticks, levers, buttons, dials, touch screens, one or more computing devices, and the like. Additionally, a right-hand floor-mounted lift lever may be used to control the amount of thrust provided by the lift fans or other propulsors. The rotation of a thumb wheel pusher throttle may be mounted on the end of this lever and may control the amount of torque provided by the pusher motor, or one or more other propulsors, alone or in combination. Any throttle as described herein may be consistent with any throttle described in U.S. patent application Ser. No. 16/929,206 filed on Jul. 15, 2020 and titled, "Hover and Thrust Control Assembly for Dual-Mode Aircraft", which is incorporated herein in its entirety by reference. At least a sensor 104 may be mechanically and communicatively connected to an inceptor stick. The pilot input may include a left-hand strain-gauge style STICK for the control of roll, pitch and yaw in both forward and assisted lift flight. A 4-way hat switch on top of the left-hand stick enables the pilot to set roll and pitch trim. Any inceptor stick described herein may be consistent with any inceptor or directional control as described in U.S. patent application Ser. No. 17/001,845 filed on Aug. 25, 2020 and titled, "A Hover and Thrust Control Assembly for a Dual-Mode Aircraft", which is incorporated herein in its entirety by reference.

Referring still to FIG. 1, at least a sensor 104 may be mechanically and communicatively connected to a foot pedal. Flight control system 104 may incorporate wheeled landing gear steerable by differential braking accessed by floor mounted pedals; in the event of installing such a foot actuated "caveman" infrastructure, yaw control also may be affected through differential foot pressure. A stick may be calibrated at zero input (relaxed state) and at the stops in pitch and roll. The calibration may be done in both directions of roll and both directions of pitch. Any asymmetries may be handled by a bilinear calibration with the breakpoint at the neutral point. Likewise, a yaw zero point may correspond to a relaxed state of an inceptor stick. The full-scale torque in each twist direction may be independently calibrated to the maximum torque seen in the calibration process in that direction. In all phases of flight, the control surface deflections may be linearly mapped to their corresponding maximum stick deflections and neutral position. In the case of roll, where there may be more aileron deflection in the trailing edge up direction, the degrees of deflection per pilot input unit may be different in each direction, such that full surface deflection may be not reached until full stick deflection. When the lift fans are engaged, the pilot's stick inputs may correspond to roll and pitch attitude (+/−30 deg) and yaw rate (+/−60 deg/second) commands, which are also linearly mapped to the full range of stick travel. A breakout force of 2-3 Newtons (0.5 lbf minimums mil spec 1797 min breakout force) measured at center of stick grip position may be applied prior to the linear mapping. Breakout force prevents adverse roll yaw coupling. In order to remove the need for constant control input in steady forward flight, pitch and roll trim may be available. Pitch trim may be limited to +7 deg pitch up trim and −5 deg pitch down trim, which may be sufficient to trim for level flight over the entire center of gravity and cruise airspeed range in non-limiting examples. Roll trim limited to 2 degrees (average between the ailerons) may be also available. The trim may be applied after the breakout force to change the input that center stick corresponds to. This trimmed command applies to both the attitude commands when the lift rotors are powered, and the control surface deflections at all times. In order to ensure the pilot can always access the full capability of the aircraft, the mapping below from pre-trim input to post-trim input may be used when trim is nonzero. Note that with positive trim, the effective sensitivity in the positive direction has decreased while the sensitivity in the negative direction has increased. This is a necessary byproduct of enforcing the constraint that full stick deflection yields full control surface deflection. The lift lever has very low additional breakout torque and requires a constant (but adjustable) torque of 3.1 Nm during movement, which translates to 2 lbf at the intended grip position. Control of the lift motors may be only active when the assisted lift lever may be raised above 3.75 degrees from the full down stop (out of 25 degrees total). This may represent a debounce mechanism that may be determined based on the friction of the assisted lift lever, the mass and the expected cockpit vibration levels. A mechanical detent may be installed on the lift lever at an angle corresponding to 15% average torque in order to provide kinesthetic feedback to the pilot of the minimum lift lever setting which provides adequate control authority via the lift fans.

With continued reference to FIG. 1, flight control system 100 may include at least a sensor 104 which may further include a sensor suite. One or more sensors may be communicatively connected to at least a pilot control, the manipulation of which, may constitute at least an aircraft command. "Communicative connecting", for the purposes of this disclosure, refers to two or more components electrically, or otherwise connected and configured to transmit and receive signals from one another. Signals may include electrical, electromagnetic, visual, audio, radio waves, or another undisclosed signal type alone or in combination. Any datum or signal herein may include an electrical signal. Electrical signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. At least a sensor 104 may include circuitry, computing devices, electronic components or a combination thereof that translates input datum 108 into at least an electronic signal configured to be transmitted to another electronic component. At least a sensor communicatively connected to at least a pilot control may include a sensor disposed on, near, around or within at least pilot control. At least a sensor may include a motion sensor. "Motion sensor", for the purposes of this disclosure refers to a device or component configured to detect physical movement of an object or grouping of objects. One of ordinary skill in the art would appreciate, after reviewing the entirety of this disclosure, that motion may include a plurality of types including but not limited to: spinning, rotating, oscillating, gyrating, jumping, sliding, reciprocating, or the like. At least a sensor may include, torque sensor, gyroscope, accelerometer, torque sensor, magnetometer, inertial measurement unit (IMU), pressure sensor, force sensor, proximity sensor, displacement sensor, vibration sensor, among others. At least a sensor 104 may include a sensor suite which may include a plurality of sensors that may detect similar or unique phenomena. For example, in a non-limiting embodiment, sensor suite may include a plurality of accelerometers, a mixture of accelerometers and gyroscopes, or a mixture of an accelerometer, gyroscope, and torque sensor.

Still referring to FIG. 1, at least a sensor may include a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability to detect phenomenon is maintained and in a non-limiting example, a user alter aircraft usage pursuant to sensor readings. At least a sensor may be configured to detect pilot input from at least pilot control. At least pilot control may include a throttle lever, inceptor stick, collective pitch control, steering wheel, brake pedals, pedal controls, toggles, joystick. One of ordinary skill in the art, upon reading the entirety of this disclosure would appreciate the variety of pilot input controls that may be present in an electric aircraft consistent with the present disclosure. Inceptor stick may be consistent with disclosure of inceptor stick in U.S. patent application Ser. No. 17/001,845 and titled "A HOVER AND THRUST CONTROL ASSEMBLY FOR DUAL-MODE AIRCRAFT", which is incorporated herein by reference in its entirety. Collective pitch control may be consistent with disclosure of collective pitch control in U.S. patent application Ser. No. 16/929,206 and titled "HOVER AND THRUST CONTROL ASSEMBLY FOR DUAL-MODE AIRCRAFT", which is incorporated herein by reference in its entirety.

Further referring to FIG. 1, at least pilot control may be physically located in the cockpit of the aircraft or remotely located outside of the aircraft in another location communicatively connected to at least a portion of the aircraft. "Communicatively connection", for the purposes of this disclosure, is a process whereby one device, component, or circuit is able to receive data from and/or transmit data to another device, component, or circuit; communicative connecting may be performed by wired or wireless electronic communication, either directly or by way of one or more intervening devices or components. In an embodiment, communicative connecting includes electrically coupling an output of one device, component, or circuit to an input of another device, component, or circuit. Communicative connecting may be performed via a bus or other facility for intercommunication between elements of a computing device. Communicative connecting may include indirect connections via "wireless" connection, low power wide area network, radio communication, optical communication, magnetic, capacitive, or optical coupling, or the like. At least pilot control may include buttons, switches, or other binary inputs in addition to, or alternatively than digital controls about which a plurality of inputs may be received. At least pilot control may be configured to receive pilot input. Pilot input may include a physical manipulation of a control like a pilot using a hand and arm to push or pull a lever, or a pilot using a finger to manipulate a switch. Pilot input may include a voice command by a pilot to a microphone and computing system consistent with the entirety of this disclosure. One of ordinary skill in the art, after reviewing the entirety of this disclosure, would appreciate that this is a non-exhaustive list of components and interactions thereof that may include, represent, or constitute, or be connected to at least a sensor 104.

In an embodiment, and still referring to FIG. 1, at least a sensor 104 may be attached to one or more pilot inputs and attached to one or more pilot inputs, one or more portions of an aircraft, and/or one or more structural components, which may include any portion of an aircraft as described in this disclosure. As used herein, a person of ordinary skill in the art would understand "attached" to mean that at least a portion of a device, component, or circuit is connected to at least a portion of the aircraft via a mechanical connection. Said mechanical connection can include, for example, rigid coupling, such as beam coupling, bellows coupling, bushed pin coupling, constant velocity, split-muff coupling, diaphragm coupling, disc coupling, donut coupling, elastic coupling, flexible coupling, fluid coupling, gear coupling, grid coupling, hirth joints, hydrodynamic coupling, jaw coupling, magnetic coupling, Oldham coupling, sleeve coupling, tapered shaft lock, twin spring coupling, rag joint coupling, universal joints, or any combination thereof. In an embodiment, mechanical coupling can be used to connect the ends of adjacent parts and/or objects of an electric aircraft. Further, in an embodiment, mechanical coupling can be used to join two pieces of rotating electric aircraft components. Control surfaces may each include any portion of an aircraft that can be moved or adjusted to affect altitude, airspeed velocity, groundspeed velocity or direction during flight. For example, control surfaces may include a component used to affect the aircrafts' roll and pitch which may comprise one or more ailerons, defined herein as hinged surfaces which form part of the trailing edge of each wing in a fixed wing aircraft, and which may be moved via mechanical means such as without limitation servomotors, mechanical linkages, or the like, to name a few. As a further example, control surfaces may include a rudder, which may include, without limitation, a segmented rudder. The rudder may function, without limitation, to control yaw of an aircraft. Also, control surfaces may include other flight control surfaces such as propulsors, rotating flight controls, or any other structural features which can adjust the movement of the aircraft. A "control surface" as described herein, is any form of a mechanical linkage with a surface area that interacts with forces to move an aircraft. A control surface may include, as a non-limiting example, ailerons, flaps, leading edge flaps, rudders, elevators, spoilers, slats, blades, stabilizers, stabilators, airfoils, a combination thereof, or any other mechanical surface are used to control an aircraft in a fluid medium. Persons skilled in the art, upon reviewing the entirety of this disclosure, will be aware of various mechanical linkages that may be used as a control surface, as used and described in this disclosure.

With continued reference to FIG. 1, at least a sensor 104 is configured to capture at least an input datum 108 from a pilot, remote user, or one or more of the previous, alone or in combination. At least an input datum 108 may include a manipulation of one or more pilot input controls as described above that correspond to a desire to affect an aircraft's trajectory as a function of the movement of one or more flight components and one or more propulsors, alone or in combination. "Flight components", for the purposes of this disclosure, includes components related to, and mechanically connected to an aircraft that manipulates a fluid medium in order to propel and maneuver the aircraft through the fluid medium. The operation of the aircraft through the fluid medium will be discussed at greater length hereinbelow. At least an input datum 108 may include information gathered by one or more sensors.

With continued reference to FIG. 1, a "datum", for the purposes of this disclosure, refers to at least an element of data identifying and/or a pilot input or command. At least pilot control may be communicatively connected to any other component presented in system, the communicative connection may include redundant connections configured to safeguard against single-point failure. Pilot input may indicate a pilot's desire to change the heading or trim of an electric aircraft. Pilot input may indicate a pilot's desire to change an aircraft's pitch, roll, yaw, or throttle. Aircraft trajectory is manipulated by one or more control surfaces and propulsors working alone or in tandem consistent with the entirety of this disclosure, hereinbelow. Pitch, roll, and yaw may be used to describe an aircraft's attitude and/or heading, as they correspond to three separate and distinct axes about which the aircraft may rotate with an applied moment, torque, and/or other force applied to at least a portion of an aircraft. "Pitch", for the purposes of this disclosure refers to an aircraft's angle of attack, that is the difference between the aircraft's nose and the horizontal flight trajectory. For example, an aircraft pitches "up" when its nose is angled upward compared to horizontal flight, like in a climb maneuver. In another example, the aircraft pitches "down", when its nose is angled downward compared to horizontal flight, like in a dive maneuver. When angle of attack is not an acceptable input to any system disclosed herein, proxies may be used such as pilot controls, remote controls, or sensor levels, such as true airspeed sensors, pitot tubes, pneumatic/hydraulic sensors, and the like. "Roll" for the purposes of this disclosure, refers to an aircraft's position about its longitudinal axis, that is to say that when an aircraft rotates about its axis from its tail to its nose, and one side rolls upward, like in a banking maneuver. "Yaw", for the purposes of this disclosure, refers to an aircraft's turn angle, when an aircraft rotates about an imaginary vertical axis intersecting the center of the earth and the fuselage of the aircraft. "Throttle", for the purposes of this disclosure, refers to an aircraft outputting an amount of thrust from a propulsor. Pilot input, when referring to throttle, may refer to a pilot's desire to increase or decrease thrust produced by at least a propulsor.

With continued reference to FIG. 1, at least an input datum 104 may include an electrical signal. At least an input datum 104 may include mechanical movement of any throttle consistent with the entirety of this disclosure. Electrical signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. At least a sensor may include circuitry, computing devices, electronic components or a combination thereof that translates pilot input into at least an input datum 104 configured to be transmitted to any other electronic component.

With continued reference to FIG. 1, flight control system 100 includes an inertial measurement unit (IMU) 112. IMU 112 may be an IMU as described herein. IMU 112 is configured to detect at least an aircraft angle 116. At least an aircraft angle 116 may include any information about the orientation of the aircraft in three-dimensional space such as pitch angle, roll angle, yaw angle, or some combination thereof. In non-limiting examples, at least an aircraft angle may use one or more notations or angular measurement systems like polar coordinates, cartesian coordinates, cylindrical coordinates, spherical coordinates, homogenous coordinates, relativistic coordinates, or a combination thereof, among others. IMU 112 is configured to detect at least an aircraft angle rate 116. At least an aircraft angle rate 116 may include any information about the rate of change of any angle associated with an electrical aircraft as described herein. Any measurement system may be used in the description of at least an aircraft angle rate 116.

With continued reference to FIG. 1, flight control system 100 includes flight controller 124. Flight controller 124 may be responsible only for mapping the pilot inputs such as input datum 108, attitude such as at least an aircraft angle 116, and body angular rate measurement such as at least an aircraft angle rate 120 to motor torque levels necessary to meet the input datum 108. In a non-limiting exemplary embodiment, flight controller 124 may include the nominal attitude command (ACAH) configuration, the flight controller 124 may make the vehicle attitude track the pilot attitude while also applying the pilot-commanded amount of assisted lift and pusher torque which may be encapsulated within motor torque command 148. The flight controller is responsible only for mapping the pilot inputs, attitude, and body angular rate measurements to motor torque levels necessary to meet the input datum 108. In the nominal attitude command (ACAH) configuration, flight controller 124 makes the vehicle attitude track the pilot attitude while also applying the pilot commanded amount of assisted lift and pusher torque. Flight controller 124 may include the calculation and control of avionics display of critical envelope information i.e., stall warning, vortex ring state, pitch limit indicator, angle of attack, transition envelopes, etc. Flight controller 124 may calculate, command, and control trim assist, turn coordination, pitch to certain gravitational forces, automation integration: attitude, position hold, LNAV, VNAV etc., minimum hover thrust protection, angle of attack limits, etc., precision Autoland, other aspects of autopilot operations, advanced perception of obstacles for 'see and avoid' missions, and remote operations, among others. Flight control system 100 includes flight controller 124, wherein the flight controller 124 may further include a processor. The processor may include one or more processors as described herein, in a near limitless arrangement of components.

With continued reference to FIG. 1, flight control system 100 includes an outer loop controller 128. Outer loop controller 128 may include one or more computing devices consistent with this disclosure and/or one or more components and/or modules thereof. Outer loop controller 128 may be implemented using a microcontroller, a hardware circuit such as an FPGA, system on a chip, and/or application specific integrated circuit (ASIC). Outer loop controller 128 may be implemented using one or more analog elements such as operational amplifier circuits, including operational amplifier integrators and/or differentiators. Outer loop controller 128 may be implemented using any combination of the herein described elements or any other combination of elements suitable therefor. Outer loop controller 128 may be configured to input one or more parameters, such as input datum 108 and/or at least an aircraft angle 116 and output rate setpoint 132. Outer loop controller 128 may periodically detect one or more errors between aircraft angles and commanded angles in any one of pitch, roll, yaw, or a combination thereof. For example, and without limitation, outer loop controller 128 may detect the error between the commanded and detected aircraft angle and command one or more propulsors and or flight components consistent with the entirety of this disclosure to reduce said error in one or more iterations. Outer loop controller 128 may be closed by a PI controller with integral anti-windup via back-calculation. Additional logic is present to prevent integral windup while grounded on a not perfectly level surface. Gains may be reduced at large amplitude in order to reduce overshoot on large inputs. This excessive overshoot may be due in part to linear systems having constant percent overshoot, so at larger amplitudes, the absolute value of the overshoot becomes (potentially unacceptably) large. Additionally, on large step inputs, motor saturation (a nonlinear effect) may occur for extended periods of time and causes overshoot to increase. In extreme cases, the occurrence of motor saturation without any gain reduction may lead to unrecoverable tumbles. This gain reduction may be implemented as a (soft) rate command limit. In particular, this reduction may be given by the piecewise combination of a linear function and the square root function. Note that the input/output relationship may be monotonically increasing, so increased angle error or integral action always makes it through to the inner loop, even if the gain reduction may be engaged. For inputs less than the knee, set to 20 deg/s, the input may be not changed. Above the knee, the output may be given by sign(input)*sqrt(abs(input)*knee). The effective gain at any point to the right of the knee may be then given by sqrt(abs(input)*knee)/input. This gain decrease at large amplitudes has been shown in simulation to stabilize the vehicle when subject to inputs that would otherwise destabilize the vehicle into an unrecoverable tumble. For the vast majority of maneuvers, this soft rate limit may be set high enough to not be noticeable.

With continued reference to FIG. 1, outer loop controller 128 is configured to receive at least an input datum 108 from at least a sensor 104. Input datum 108 represents the pilot's desire to change an electric aircraft's heading or power output. Input datum 108 may be transmitted to one or more components from the pilot control to which it may be connected. Outer loop controller 128 may include circuitry, components, processors, transceivers, or a combination thereof configured to receive and/or send electrical signals. Input datum 108 and other inputs to this system may include pilot manipulations of physical control interfaces, remote signals generated from electronic devices, voice commands, physiological readings like eye movements, pedal manipulation, or a combination thereof, to name a few. Outer loop controller 128 may include a proportional-integral-derivative (PID) controller. PID controllers may automatically apply accurate and responsive correction to a control function in a loop, such that over time the correction remains responsive to the previous output and actively controls an output. Flight controller 104 may include damping, including critical damping to attain the desired setpoint, which may be an output to a propulsor in a timely and accurate way.

With continued reference to FIG. 1, outer loop controller 128 is configured to receive at least an aircraft angle 116 from the inertial measurement unit 112. Inertial measurement unit 112, as discussed, may be configured to detect at least an aircraft angle 116. Outer loop controller 128 may include components, circuitry, receivers, transceivers, or a combination thereof configured to receive at least an aircraft angle 116 in the form of one or more electrical signals consistent with the description herein. Outer loop controller 128 is configured to generate rate setpoint 132 as a function of at least an input datum 108. The flight controller uses an outer angle loop driving an inner rate loop to provide closed loop control with setpoints of desired pitch attitude, roll attitude, and yaw rate provided directly by the pilot. The outer (angle) loop provides a rate setpoint. Rate setpoint 132 may include the desired rate of change of one or more angles describing the aircraft's orientation, heading, and propulsion, or a combination thereof. Rate setpoint 132 may include the pilot's desired rate of change of aircraft pitch angle, consistent with pitch angles, and largely at least an aircraft angle 116 in the entirety of this disclosure. Rate setpoint 132 may include a measurement in a plurality of measurement systems including quaternions or any other measurement system as described herein.

With continued reference to FIG. 1, flight controller 124 includes inner loop controller 136. Inner loop controller 136 may be implemented in any manner suitable for implementation of outer loop controller. The inner loop of the flight controller may be composed of a lead-lag filter for roll rate, pitch rate, and yaw rate, and an integrator that acts only on yaw rate. Integrators may be avoided on the roll and pitch rate because they introduce additional phase lag that, coupled with the phase lag inherent to slow lift fans or another type of one or more propulsors, limits performance. Furthermore, it may not be necessary to have good steady state error in roll and pitch rate, which an integrator helps achieve in yaw rate. A final component of the inner loop may include gain scheduling on lift lever input. As previously discussed, the only controller change between low speed flight and fully wing-borne flight may be this gain scheduling. The plot below shows the input to output gain of this function for varying lift lever inputs. At anything above the assisted lift input corresponding to zero airspeed flight, the full requested moment from the inner loop may be sent to the mixer. At assisted lift levels lower than this, the requested moment from the inner loop may be multiplied by a gain that linearly decays to zero as shown in the plot below. The exact shape of this gain reduction may be open to change slightly. Experimentation in simulation has shown that anything between a square root function up to the IGE average torque setting and the linear map shown above works acceptably. Because the moment that can be generated by the control surfaces in pitch may be such a strong function of angle of attack, the relatively small difference in hover moment achieved between the linear and square root maps may be washed out by the angle of attack variation in a transition. At low lift lever input, the plane would have to have significant unpowered lift (and therefore airspeed) to not lose altitude. In this case, the control surface effectivity will be significant, and full moment production from the lift motors will not be necessary. When the lift lever may be all the way down, the lift motors may stop rotation and stow into a low drag orientation. Then, the only control authority comes from the aerodynamic control surfaces, and the plane controlled exclusively via manual pilot inputs. On transition out from vertical to cruise flight, the coordination and scheduling of control may be intuitive and straightforward. In a non-limiting example, during the transition in, or decelerating from an aborted takeoff, it may be important that the pilot not decrease assisted lift below a 15% average torque threshold in order to maintain aircraft control and not develop an unrecoverable sink rate when operating in certain airspeed regimes such as the transition regime. A mechanical detent may be installed in the lift lever, throttle, or any control input, to provide proprioceptive feedback when crossing this threshold which should occur operationally only during the terminal phases of a vertical landing.

With continued reference to FIG. 1, inner loop controller 136 is configured to receive at least an aircraft angle rate 120. Inner loop controller 136 is configured to receive the rate setpoint 132 from the outer loop controller 128. Inner loop controller 136 is configured to generate a moment datum 140 as a function of the rate setpoint 132. Moment datum 140 may include any information describing the moment of an aircraft. Moment datum 140 includes information regarding pilot's desire to apply a certain moment or collection of moments on one or more portions of an electric aircraft, including the entirety of the aircraft.

With continued reference to FIG. 1, inner loop controller 136 may include a lead-lag-filter. Inner loop controller 136 may include an integrator. The attitude controller gains are scheduled such that full gain authority may be only achieved when the assisted lift lever may be greater than 50% torque, which corresponds to a nominal torque required to support the aircraft without fully developed lift from the wing. At average torque levels lower than said nominal levitation torque, the output of the inner loop (desired moment vector to apply to the vehicle) may be directly scaled down. This decrease in moment generated at the lift rotors may be designed to be directly complementary to the increase in aerodynamic control surface effectivity as the dynamic pressure builds on the flying wing and the flying surfaces. As a result, the total moment applied to the vehicle for a given pilot input may be kept near constant.

With continued reference to FIG. 1, flight control system 100 includes mixer 144. Mixer 144 may identify how much moment was generated by aerodynamic forces acting on one or more flight components and propulsors and may feed this back to inner loop controller 136 and outer loop controller 128 to prevent integral windup. A dynamic inverse of the lift rotor system may be applied to the motor torque command 148 to compensate for the rotor inertia, which will be discussed at greater length hereinbelow. The input datum 108, which represents one or more desires of a pilot or user that may include pusher torques, may be directly passed through the controller; full rotation of the pusher throttle yields full torque at the pusher. As discussed previously, the control surface deflections are driven directly from the pilot roll, pitch, and yaw inputs, which may also be included in input datum 108. Mixer 144 may map desired vehicle level control torques (as produced by the inner loop controller 136) to appropriate actuator outputs via knowledge of the vehicle layout and properties. In the case that motor saturation prevents the achievement of the desired vehicle level control torques, the mixer will deprioritize the yaw moment, then assisted lift, then roll moment, and finally pitch moment.

With continued reference to FIG. 1, mixer 144 may include a logic circuit. Mixer 144 may be implemented using an electrical logic circuit. "Logic circuits", for the purposes of this disclosure, refer to an arrangement of electronic components such as diodes or transistors acting as electronic switches configured to act on one or more binary inputs that produce a single binary output. Logic circuits may include devices such as multiplexers, registers, arithmetic logic units (ALUs), computer memory, and microprocessors, among others. In modern practice, metal-oxide-semiconductor field-effect transistors (MOSFETs) may be implemented as logic circuit components. Mixer 144 may be implemented using a processor. Mixer 144 is configured to receive the moment datum 140 for at least a propulsor from inner loop controller 136. Mixer 144 solves at least an optimization problem. At least an optimization problem may include solving the pitch moment function that may be a nonlinear program.

With continued reference to FIG. 1, a "mixer", for the purposes of this disclosure, may be a component that takes in at least an incoming signal, such as moment datum 140 including plurality of attitude commands and allocates one or more outgoing signals, such as modified attitude commands and output torque command, or the like, to at least a propulsor, flight component, or one or more computing devices connected thereto. One of ordinary skill in the art, after reading the entirety of this disclosure, would be aware that a mixer, as used herein, may additionally or alternatively be described as performing "control allocation" or "torque allocation". For example, mixer may take in commands to alter aircraft trajectory that requires a change in pitch and yaw. Mixer may allocate torque to at least one propulsor (or more) that do not independently alter pitch and yaw in combination to accomplish the command to change pitch and yaw. More than one propulsor may be required to adjust torques to accomplish the command to change pitch and yaw, mixer would take in the command and allocate those torques to the appropriate propulsors consistent with the entirety of this disclosure. One of ordinary skill in the art, after reading the entirety of this disclosure, will appreciate the limitless combination of propulsors, flight components, control surfaces, or combinations thereof that could be used in tandem to generate some amount of authority in pitch, roll, yaw, and lift of an electric aircraft consistent with this disclosure. Mixer may be a nonlinear program-based mixer that create new frequencies from two signals applied to it. In most applications, two signals are applied to mixer, and it produces new signals at the sum and difference of the original frequencies. Other frequency component may also be produced in a practical frequency mixer. One of ordinary skill in the art would understand that, in general, mixers are widely used to shift signals from one frequency range to another, a process known as heterodyning. Another form of mixer operates by switching, with the smaller input signal being passed inverted or noninverted according to the phase of the local oscillator (LO). This would be typical of the normal operating mode of a packaged double balanced mixer, with the local oscillator drive considerably higher than the signal amplitude. Mixer may be consistent with any mixer described herein. Mixer may be implemented using an electrical logic circuit. "Logic circuits", for the purposes of this disclosure, refer to an arrangement of electronic components such as diodes or transistors acting as electronic switches configured to act on one or more binary inputs that produce a single binary output. Logic circuits may include devices such as multiplexers, registers, arithmetic logic units (ALUs), computer memory, and microprocessors, among others. In modern practice, metal-oxide-semiconductor field-effect transistors (MOSFETs) may be implemented as logic circuit components. Mixer may be implemented using a processor. Mixer is configured to receive the initial vehicle torque signal for at least a propulsor from flight controller. Mixer solves at least an optimization problem. At least an optimization problem may include solving the pitch moment function that may be a nonlinear program. Torque allocation performed by mixer 144 may be consistent with the description of torque allocation in U.S. patent application Ser. No. 17/197,427 filed on Mar. 10, 2021 and titled, "SYSTEM AND METHOD FOR FLIGHT CONTROL IN ELECTRIC AIRCRAFT", which is incorporated herein in its entirety by reference.

With continued reference to FIG. 1, mixer may be configured to solve at least an optimization problem, which may be an objective function. An "objective function," as used in this disclosure, is a mathematical function with a solution set including a plurality of data elements to be compared. Mixer may compute a score, metric, ranking, or the like, associated with each performance prognoses and candidate transfer apparatus and select objectives to minimize and/or maximize the score/rank, depending on whether an optimal result may be represented, respectively, by a minimal and/or maximal score; an objective function may be used by mixer to score each possible pairing. At least an optimization problem may be based on one or more objectives, as described below. Mixer may pair a candidate transfer apparatus, with a given combination of performance prognoses, that optimizes the objective function. In various embodiments solving at least an optimization problem may be based on a combination of one or more factors. Each factor may be assigned a score based on predetermined variables. In some embodiments, the assigned scores may be weighted or unweighted. Solving at least an optimization problem may include performing a greedy algorithm process, where optimization may be performed by minimizing and/or maximizing an output of objective function. A "greedy algorithm" is defined as an algorithm that selects locally optimal choices, which may or may not generate a globally optimal solution. For instance, mixer may select objectives so that scores associated therewith are the best score for each goal. For instance, in non-limiting illustrative example, optimization may determine the pitch moment associated with an output of at least a propulsor based on an input.

Still referring to FIG. 1, at least an optimization problem may be formulated as a linear objective function, which mixer may optimize using a linear program such as without limitation a mixed-integer program. A "linear program," as used in this disclosure, is a program that optimizes a linear objective function, given at least a constraint; a linear program maybe referred to without limitation as a "linear optimization" process and/or algorithm. For instance, in non-limiting illustrative examples, a given constraint might be torque limit, and a linear program may use a linear objective function to calculate maximum output based on the limit. In various embodiments, mixer may determine a set of instructions towards achieving a user's goal that maximizes a total score subject to a constraint that there are other competing objectives. A mathematical solver may be implemented to solve for the set of instructions that maximizes scores; mathematical solver may be implemented on mixer and/or another device in flight control system 100, and/or may be implemented on third-party solver. At least an optimization problem may be formulated as nonlinear least squares optimization process. A "nonlinear least squares optimization process," for the purposes of this disclosure, is a form of least squares analysis used to fit a set of m observations with a model that is non-linear in n unknown parameters, where m is greater than or equal to n. The basis of the method is to approximate the model by a linear one and to refine the parameters by successive iterations. A nonlinear least squares optimization process may output a fit of signals to at least a propulsor. Solving at least an optimization problem may include minimizing a loss function, where a "loss function" is an expression an output of which a ranking process minimizes to generate an optimal result. As a non-limiting example, mixer may assign variables relating to a set of parameters, which may correspond to score components as described above, calculate an output of mathematical expression using the variables, and select an objective that produces an output having the lowest size, according to a given definition of "size," of the set of outputs representing each of plurality of candidate ingredient combinations; size may, for instance, included absolute value, numerical size, or the like. Selection of different loss functions may result in identification of different potential pairings as generating minimal outputs.

With continued reference to FIG. 1, mixer may include an inertia compensator. An inertia compensator as described herein may be implemented in any one or more separate subsystems separate from any mixer as described herein and operate similarly to any inertia compensator implemented in a mixer. An inertia compensator may include one or more computing devices, an electrical component, circuitry, one or more logic circuits or processors, or the like, which may configured to compensate for inertia in one or more propulsors present in system. Mixer may be configured, in general, to output signals and command propulsors to produce a certain amount of torque; however, real-world propulsors contain mass, and therefore have inertia. "Inertia", for the purposes of this disclosure, is a property of matter by which it continues in its existing state of rest or uniform motion in a straight line, unless that state may be changed by an external force. Specifically, in this case, a massive object requires more force or torque to start motion than may be required to continue producing torque. In a control system, mixer must therefore modulate the would-be signal to account for inertia of the physical system being commanded. The inertia compensator may make appropriate calculations based on modified attitude command, output torque command, and other considerations like environmental conditions, available power, vehicle torque limits, among others. Inertia compensator may adjust vehicle torque limits for certain periods of time wherein, for example, output torque command may be allowed to overspeed a propulsor to start the propulsor's rotating physical components and then quickly step down the torque as required to maintain the commanded torque. The inertia compensator which may include a lead filter.

Mixer 144 is configured to generate motor torque command 148 as a function of the torque allocation. Motor torque command 148 may include at least a torque vector. Motor torque command 148 may be represented in any suitable form, which may include, without limitation, vectors, matrices, coefficients, scores, ranks, or other numerical comparators, and the like. A "vector" as defined in this disclosure is a data structure that represents one or more quantitative values and/or measures of forces, torques, signals, commands, or any other data structure as described in the entirety of this disclosure. A vector may be represented as an n-tuple of values, where n is at least two values, as described in further detail below; a vector may alternatively or additionally be represented as an element of a vector space, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and may be distributive with respect to field addition. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm: $l=\sqrt{\Sigma_{i=0}^{n}a_i^2}$, where $a_i$ is attribute number i of the vector. Scaling and/or normalization may function to make vector comparison independent of absolute quantities of attributes, while preserving any dependency on similarity of attributes. One of ordinary skill in the art would appreciate a vector to be a mathematical value consisting of a direction and magnitude.

With continued reference to FIG. 1, "torque", for the purposes of this disclosure, refers to a twisting force that tends to cause rotation. Torque is the rotational equivalent of linear force. In three dimensions, the torque may be a pseudovector; for point particles, it may be given by the cross product of the position vector (distance vector) and the force vector. The magnitude of torque of a rigid body depends on three quantities: the force applied, the lever arm vector connecting the point about which the torque may be being measured to the point of force application, and the angle between the force and lever arm vectors. A force applied perpendicularly to a lever multiplied by its distance from the lever's fulcrum (the length of the lever arm) may be its torque. A force of three newtons applied two meters from the fulcrum, for example, exerts the same torque as a force of one newton applied six meters from the fulcrum. The direction of the torque can be determined by using the right-hand grip rule: if the fingers of the right hand are curled from the direction of the lever arm to the direction of the force, then the thumb points in the direction of the torque. One of ordinary skill in the art would appreciate that torque may be represented as a vector, consistent with this disclosure, and therefore includes a magnitude of force and a direction. "Torque" and "moment" are equivalents for the purposes of this disclosure. Any torque command or signal herein may include at least the steady state torque to achieve the initial vehicle torque signal 108 output to at least a propulsor.

With continued reference to FIG. 1, as previously disclosed, solving at least an optimization problem may include solving sequential problems relating to vehicle-level inputs to at least a propulsor, namely pitch, roll, yaw, and collective force. Mixer 144 may solve at least an optimization problem in a specific order. An exemplary sequence is presented here in FIG. 1. According to exemplary embodiments, mixer 144 may solve at least an optimization problem wherein at least an optimization problem includes a pitch moment function. Solving may be performed using a nonlinear program and/or a linear program. Mixer may solve at least an optimization problem wherein solving at least an optimization program may include solving a roll moment function utilizing a nonlinear program to yield the desired amount of roll moment as a function of the desired amount of pitch moment. Mixer 144 may solve at least an optimization problem wherein solving at least an optimization program may include solving a collective force function utilizing a nonlinear program to yield the desired amount of collective force as a function of the desired amount of pitch moment and the desired amount of roll moment. Mixer 144 may solve at least an optimization problem wherein solving at least an optimization program may include solving a yaw moment function utilizing a nonlinear program to yield the desired amount of yaw moment, as a function of the desired amount of pitch moment, the desired amount of roll moment, and the desired amount of collective force. One of ordinary skill in the art, after reading the entirety of this disclosure, will appreciate that any force program may be implemented as a linear or non-linear program, as any linear program may be expressed as a nonlinear program.

With continued reference to FIG. 1, mixer 144 may include one or more computing devices as described herein. Mixer 144 may be a separate component or grouping of components from those described herein. Mixer 144 is configured to generate motor torque command 148 as a function of the torque allocation. Mixer 144 may be configured to allocate a portion of total possible torque amongst one or more propulsors based on relative priority of a plurality attitude control commands and desired aircraft maneuver. In a non-limiting illustrative example, torque allocation between two attitude control components (e.g., pitch and roll or roll and yaw) may be based on the relative priorities of those two attitude control components. Priority refers to how important to the safety of the aircraft and any users while performing the attitude control component may be relative to the other attitude control commands. Priority may also refer to the relative importance of each attitude control component to accomplish one or more desired aircraft maneuvers. For example, pitch attitude control component may be the highest priority, followed by roll, lift, and yaw attitude control components. In another example, the relative priority of the attitude components may be specific to an environment, aircraft maneuver, mission type, aircraft configuration, or other factors, to name a few. Torque allocator may set the highest priority attitude control component torque allocation as close as possible given the torque limits as described in this disclosure to the original command for the higher-priority attitude control component, in the illustrative example, pitch, then project to the value possible for the lower priority attitude control component, in this case, lift. The higher priority attitude control component in the first torque allocation may be the attitude control component with the highest overall priority. This process may be then repeated with lower priority attitude control component from the above comparison and the next highest down the priority list. In a non-limiting illustrative example, the next two-dimensional torque allocation problem solved would include lift and roll attitude control commands. In embodiments, the lower priority attitude command component has already been set form the previous two-dimensional torque allocation, so this may be projecting the closest possible value for the third-level attitude command (roll in this example). This process would repeat again for the third and fourth attitude components, in this non-limiting example, roll and yaw attitude control components. Since roll may be prioritized over yaw, the roll attitude control command would be preserved, and yaw would be sacrificed as a function of the vehicle torque limits as described herein. After the sequence of two-dimensional attitude control component torque allocation are completed and four prioritized attitude component commands are set, one or more components may send out commands to flight control surfaces/propulsors to generate the set torque values allocated in the foregoing process. As a non-limiting example of one step in the torque allocation process, pitch axis may represent the command or plurality of attitude commands inputted to mixer 144 as described herein, such as moment datum 140. Pitch axis may be conditioned or altered to be inputted to mixer 144. For example, and without limitation, initial vehicle torque signal may include pitch and lift commands within plurality of attitude commands. Mixer 144 may also receive at least a moment datum 140, which may be represented without limitation by a box plotted within the pitch and lift axes. A point where pitch command and lift command intersect may represent initial vehicle torque signal as projected onto exemplary graph of pitch and lift axes, which may be the same or similar to initial vehicle torque signal as disclosed in the entirety of this disclosure. Mixer 144 utilizes prioritization data as described in the entirety of this disclosure to solve this two-dimensional problem by preserving the higher priority command and sacrificing the lower priority command. This prioritization preservation process may be illustrated, as a non-limiting example by placement of a modified attitude command, wherein the pitch command was preserved (horizontally translated and therefore unchanged from the initial command), while the lift command was lessened to bring the modified attitude command within vehicle torque limits (the box). The modified attitude command, as discussed in the entirety of this disclosure, may be further combined, modified, conditioned, or otherwise adjusted to produce output torque command to the plurality of propulsors. The remaining vehicle torque represents the remaining torque capability in one or more propulsors before, during, and after an aircraft maneuver. The remaining vehicle torque may include an individual propulsor's remaining torque capability, one or more of pitch, roll, yaw, and lift, capabilities of one or more propulsors, the remaining vehicle-level torque or power for subsequent maneuvers. The remaining vehicle torque may be displayed to a pilot or user. The above-described may be a non-limiting example of one step in the torque allocation process. Torque allocation process may be similar or the same process as described above with the torque limits adjusted for inertia compensation. Mixer 144 may be disposed fully or partially within mixer any mixer as disclosed herein. Mixer 144 may include one or more computing devices as described herein. Mixer 144 also receives at least a vehicle torque limit represented by an imaginary box plotted within the pitch and lift axes, which may be the same as, or similar to at least a vehicle torque limit. Here instead of the box being made of straight linear sides, the inertia compensation as previously discussed creates curved limits, wherein certain plurality of attitude commands may be allowed whereas without inertia compensation they would be outside of the limits. Where the pitch command and lift command intersect may be the initial vehicle torque signal, which may be the same or similar to initial vehicle torque signal as disclosed in the entirety of this disclosure. Mixer 144 utilizes prioritization data as described in the entirety of this disclosure to solve this two-dimensional problem by preserving the higher priority command and sacrificing the lower priority command. This prioritization preservation process may be shown by the placement of modified attitude command, wherein the pitch command was preserved (horizontally translated and therefore unchanged from the initial command), while the lift command was lessened to bring the modified attitude command within vehicle torque limits (the box). Motor torque command 148 effectively commands the amount of torque to one or more propulsors to accomplish the closest vehicle level torque to initial vehicle torque signal as possible given certain limits, maneuvers, and aircraft conditions. Modified attitude command, as discussed in the entirety of this disclosure, may be further combined, modified, conditioned, or otherwise adjusted to produce output torque command to the plurality of propulsors. The remaining vehicle torque represents the remaining torque capability in one or more propulsors before, during, and after an aircraft maneuver. The remaining vehicle torque may include an individual propulsor's remaining torque capability, one or more of pitch, roll, yaw, and lift, capabilities of one or more propulsors, the remaining vehicle-level torque or power for subsequent maneuvers. Remaining vehicle torque may be displayed to a pilot or user.

With continued reference to FIG. 1, motor torque command 148 may be transmitted to a plurality of flight components. Flight components and control surfaces may be commanded exclusively by the pilot or by one or more users, or one or more computing devices. Flight components may be consistent with any of the flight components and/or control surfaces as described herein. "Flight components", for the purposes of this disclosure, includes components related to, and mechanically connected to an aircraft that manipulates a fluid medium in order to propel and maneuver the aircraft through the fluid medium. The operation of the aircraft through the fluid medium will be discussed at greater length hereinbelow. At least an input datum 104 may include information gathered by one or more sensors. In non-limiting embodiments, flight components may include propulsors, wings, rotors, propellers, pusher propellers, ailerons, elevators, stabilizers, stabilators, and the like, among others.

Figure 2:
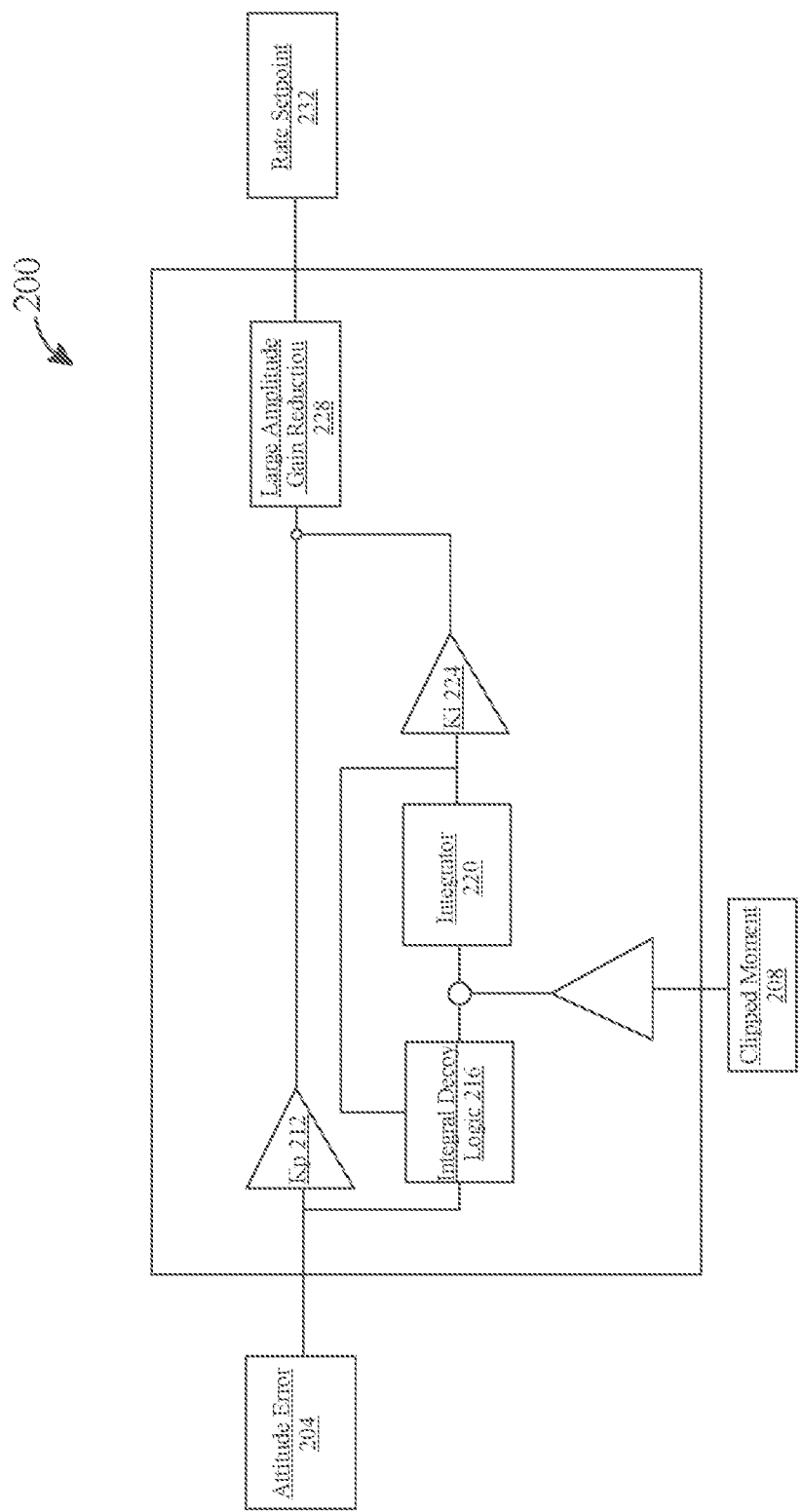
FIG. 2 is an illustrative embodiment of an outer loop controller for use in embodiments of the present invention.

Referring now to FIG. 2, an exemplary embodiment of outer loop controller 200 is presented in block diagram form. Outer loop controller 200 may be consistent with any outer loop controller as described herein. Outer loop controller 200 may include attitude error 204. Attitude error 204 may include a measurement of the difference between the commanded at least an aircraft angle 116 and the actual angle of the aircraft in any of pitch, roll, yaw, or a combination thereof. The attitude error 204 may include a percentage, measurement in degrees, measurement in radians, or one or more representations of a difference in commanded aircraft angle as a function of input datum 104 and actual angle of aircraft in the aforementioned attitudes. Attitude error 204 may include measurements as detected by one or more sensors configured to measure aircraft angle like an IMU, gyroscope, motion sensor, optical sensor, a combination thereof, or another sensor of combination of sensors. Outer loop controller 200 may include clipped moment 208 as an input to controller. Clipped moment 208 may include one or more elements of data that have been selected from a larger sample size or range. Clipped moment 208 may have been selected for its lack of noise, improved efficiency, or accuracy of moment associated with any one or more elements of an electric aircraft consistent with the entirety of this disclosure. Gain may be a linear operation. Gain compression may be not linear and, as such, its effect may be one of distortion, due to the nonlinearity of the transfer characteristic which also causes a loss of 'slope' or 'differential' gain. So, the output may be less than expected using the small signal gain of the amplifier. In clipping, the signal may be abruptly limited to a certain amplitude and may be thereby distorted in keeping under that level. This creates extra harmonics that are not present in the original signal. "Soft" clipping or limiting means there isn't a sharp "knee point" in the transfer characteristic. A sine wave that has been softly clipped will become more like a square wave with more rounded edges but will still have many extra harmonics. Outer loop controller 200 may include Kp operational amplifier 212. Kp op amp 212 may include one or more constants configured to scale any one or more signals in any control loop or otherwise computing devices for use in controlling aspects of an electric aircraft. Outer loop controller 200 may include integral decoy logic 216. Outer loop controller 200 may include integrator 220. Integrator 220 may include an operational amplifier configured to perform a mathematical operation of integration of a signal; output voltage may be proportional to input voltage integrated over time. An input current may be offset by a negative feedback current flowing in the capacitor, which may be generated by an increase in output voltage of the amplifier. The output voltage may be therefore dependent on the value of input current it has to offset and the inverse of the value of the feedback capacitor. The greater the capacitor value, the less output voltage has to be generated to produce a particular feedback current flow. The input impedance of the circuit may be almost zero because of the Miller effect. Hence all the stray capacitances (the cable capacitance, the amplifier input capacitance, etc.) are virtually grounded and they have no influence on the output signal. Operational amplifier as used in integrator may be used as part of a positive or negative feedback amplifier or as an adder or subtractor type circuit using just pure resistances in both the input and the feedback loop. As its name implies, the Op-amp Integrator is an operational amplifier circuit that causes the output to respond to changes in the input voltage over time as the op-amp produces an output voltage which may be proportional to the integral of the input voltage. In other words, the magnitude of the output signal may be determined by the length of time a voltage may be present at its input as the current through the feedback loop charges or discharges the capacitor as the required negative feedback occurs through the capacitor. Input voltage may be Vin and represent the input signal to controller such as one or more of input datum 104 and/or attitude error 204. Output voltage Vout may represent output voltage such as one or more outputs like rate setpoint 232. When a step voltage, Vin may be firstly applied to the input of an integrating amplifier, the uncharged capacitor C has very little resistance and acts a bit like a short circuit allowing maximum current to flow via the input resistor, Rin as potential difference exists between the two plates. No current flows into the amplifiers input and point X may be a virtual earth resulting in zero output. As the impedance of the capacitor at this point may be very low, the gain ratio of $X_C/R_{in}$ may be also very small giving an overall voltage gain of less than one, (voltage follower circuit). As the feedback capacitor, C begins to charge up due to the influence of the input voltage, its impedance Xc slowly increase in proportion to its rate of charge. The capacitor charges up at a rate determined by the RC time constant, (τ) of the series RC network. Negative feedback forces the op-amp to produce an output voltage that maintains a virtual earth at the op-amp's inverting input. Since the capacitor may be connected between the op-amp's inverting input (which may be at virtual ground potential) and the op-amp's output (which may be now negative), the potential voltage, Vc developed across the capacitor slowly increases causing the charging current to decrease as the impedance of the capacitor increases. This results in the ratio of Xc/Rin increasing producing a linearly increasing ramp output voltage that continues to increase until the capacitor may be fully charged. At this point the capacitor acts as an open circuit, blocking any more flow of DC current. The ratio of feedback capacitor to input resistor ($X_C/R_{IN}$) may be now infinite resulting in infinite gain. The result of this high gain (similar to the op-amps open-loop gain), may be that the output of the amplifier goes into saturation as shown below. (Saturation occurs when the output voltage of the amplifier swings heavily to one voltage supply rail or the other with little or no control in between). The rate at which the output voltage increases (the rate of change) may be determined by the value of the resistor and the capacitor, "RC time constant". By changing this RC time constant value, either by changing the value of the Capacitor, C or the Resistor, R, the time in which it takes the output voltage to reach saturation can also be changed for example. Outer loop controller 200 may include a double integrator, consistent with the description of an integrator with the entirety of this disclosure. Single or double integrators consistent with the entirety of this disclosure may include analog or digital circuit components. Outer loop controller 200 may include Ki operational amplifier 224. Ki op amp 224 may be a unique constant configured to scale any one or more signals or data as described herein with reference to kp op amp 212. Outer loop controller 200 may include large amplitude gain reduction 228. Large amplitude gain reduction 228 may be configured to reduce gain on large amplitude input signals consistent with the above description. Compression of gain may be caused by non-linear characteristics of the device when run at large amplitudes. With any signal, as the input level may be increased beyond the linear range of the amplifier, gain compression will occur. A transistor's operating point may move with temperature, so higher power output may lead to compression due to collector dissipation. But it may be not a change in gain; it may be non-linear distortion. The output level stays relatively the same as the input level goes higher. Once the non-linear portion of the transfer characteristic of any amplifier may be reached, any increase in input will not be matched by a proportional increase in output. Thus, there may be compression of gain. Also, at this time because the transfer function may be no longer linear, harmonic distortion will result. In intentional compression (sometimes called automatic gain control or audio level compression as used in devices called 'dynamic range compressors', the overall gain of the circuit may be actively changed in response to the level of the input over time, so the transfer function remains linear over a short period of time. A sine wave into such a system will still look like a sine wave at the output, but the overall gain may be varied, depending on the level of that sine wave. Above a certain input level, the output sine wave will always be the same amplitude. The output level of Intentional compression varies over time, in order to minimize non-linear behavior. With gain compression, the opposite may be true, its output may be constant. In this respect intentional compression serves less of an artistic purpose.

Figure 3:
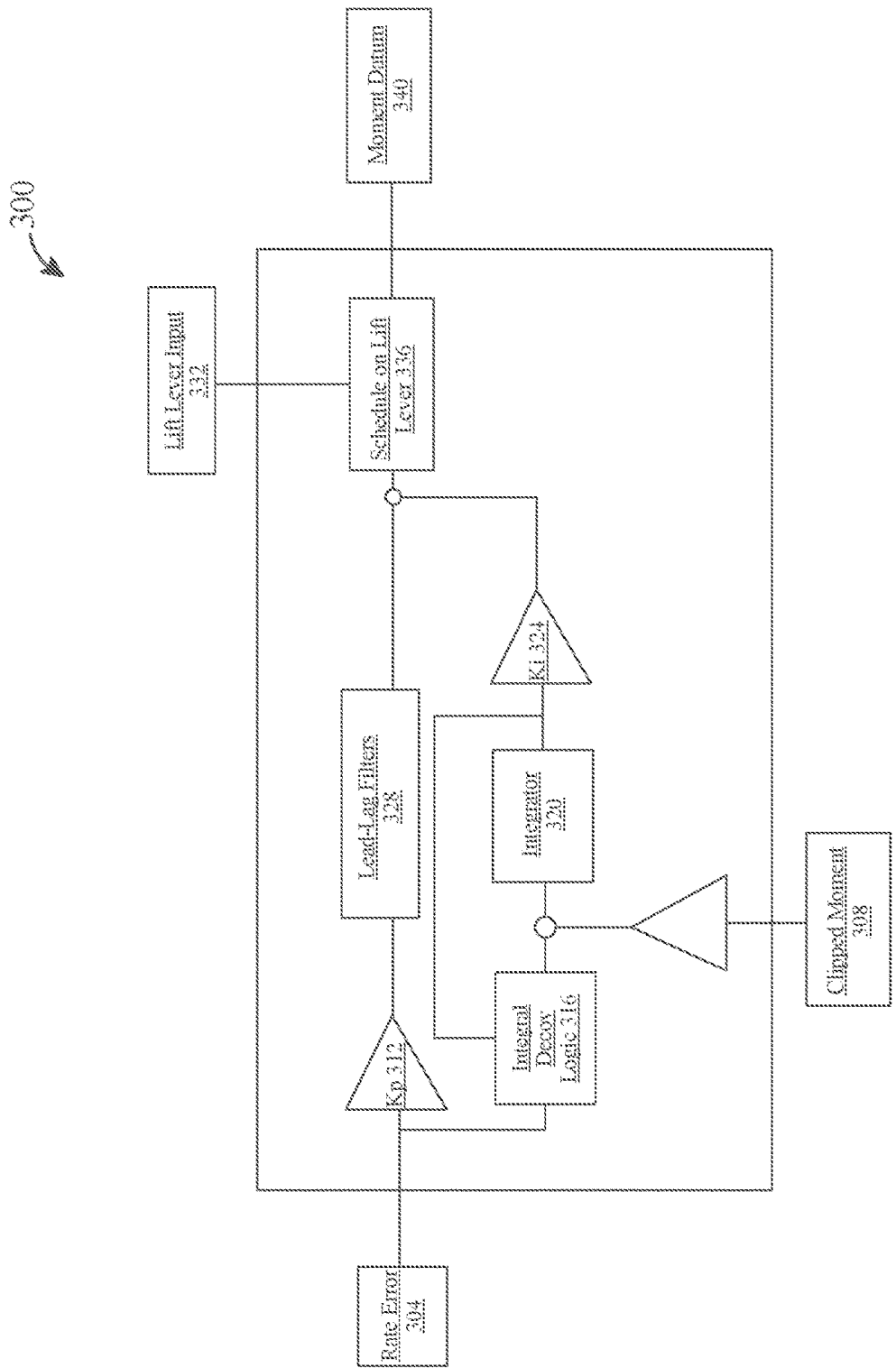
FIG. 3 is an illustrative embodiment of an inner loop controller for use in embodiments of the present invention.

Referring now to FIG. 3, an exemplary embodiment of inner loop controller 300 is presented in block diagram form. Inner loop controller 300 may include clipped moment 308 as an input to controller. Gain may be a linear operation. Gain compression may be not linear and, as such, its effect may be one of distortion, due to the nonlinearity of the transfer characteristic which also causes a loss of 'slope' or 'differential' gain. So, the output may be less than expected using the small signal gain of the amplifier. In clipping, the signal may be abruptly limited to a certain amplitude and may be thereby distorted in keeping under that level. This creates extra harmonics that are not present in the original signal. "Soft" clipping or limiting means there isn't a sharp "knee point" in the transfer characteristic. A sine wave that has been softly clipped will become more like a square wave with more rounded edges but will still have many extra harmonics. Inner loop controller 300 may include Kp operational amplifier 312. Inner loop controller 300 may include integral decoy logic 316. Inner loop controller 300 may include integrator 320. Integrator 320 may include an operational amplifier configured to perform a mathematical operation of integration of a signal; output voltage may be proportional to input voltage integrated over time. An input current may be offset by a negative feedback current flowing in the capacitor, which may be generated by an increase in output voltage of the amplifier. The output voltage may be therefore dependent on the value of input current it has to offset and the inverse of the value of the feedback capacitor. The greater the capacitor value, the less output voltage has to be generated to produce a particular feedback current flow. The input impedance of the circuit almost zero because of the Miller effect. Hence all the stray capacitances (the cable capacitance, the amplifier input capacitance, etc.) are virtually grounded and they have no influence on the output signal. Operational amplifier as used in integrator may be used as part of a positive or negative feedback amplifier or as an adder or subtractor type circuit using just pure resistances in both the input and the feedback loop. As its name implies, the Op-amp Integrator is an operational amplifier circuit that causes the output to respond to changes in the input voltage over time as the op-amp produces an output voltage which may be proportional to the integral of the input voltage. In other words, the magnitude of the output signal may be determined by the length of time a voltage may be present at its input as the current through the feedback loop charges or discharges the capacitor as the required negative feedback occurs through the capacitor. Input voltage may be Vin and represent the input signal to controller such as one or more of input datum 104 and/or attitude error 304. Output voltage Vout may represent output voltage such as one or more outputs like rate setpoint 332. When a step voltage, yin may be firstly applied to the input of an integrating amplifier, the uncharged capacitor C has very little resistance and acts a bit like a short circuit allowing maximum current to flow via the input resistor, Rin as potential difference exists between the two plates. No current flows into the amplifiers input and point X may be a virtual earth resulting in zero output. As the impedance of the capacitor at this point may be very low, the gain ratio of $X_C/R_{IN}$ may be also very small giving an overall voltage gain of less than one, (voltage follower circuit). As the feedback capacitor, C begins to charge up due to the influence of the input voltage, its impedance Xc slowly increase in proportion to its rate of charge. The capacitor charges up at a rate determined by the RC time constant, ($\tau$) of the series RC network. Negative feedback forces the op-amp to produce an output voltage that maintains a virtual earth at the op-amp's inverting input. Since the capacitor may be connected between the op-amp's inverting input (which may be at virtual ground potential) and the op-amp's output (which may be now negative), the potential voltage, Vc developed across the capacitor slowly increases causing the charging current to decrease as the impedance of the capacitor increases. This results in the ratio of Xc/Rin increasing producing a linearly increasing ramp output voltage that continues to increase until the capacitor may be fully charged. At this point the capacitor acts as an open circuit, blocking any more flow of DC current. The ratio of feedback capacitor to input resistor ($X_C/R_{IN}$) may be now infinite resulting in infinite gain. The result of this high gain, similar to the op-amps open-loop gain, may be that the output of the amplifier goes into saturation as shown below. (Saturation occurs when the output voltage of the amplifier swings heavily to one voltage supply rail or the other with little or no control in between). The rate at which the output voltage increases (the rate of change) may be determined by the value of the resistor and the capacitor, "RC time constant". By changing this RC time constant value, either by changing the value of the Capacitor, C or the Resistor, R, the time in which it takes the output voltage to reach saturation can also be changed for example. Inner loop controller 300 may include a double integrator, consistent with the description of an integrator with the entirety of this disclosure. Single or double integrators consistent with the entirety of this disclosure may include analog or digital circuit components. Inner loop controller 300 may include Ki operational amplifier 324. Inner loop controller 300 may include lead-lag filters 328 consistent with the description of lead-lag filters herein below. Inner loop controller 300 may include lift lever input 332 as described herein below. Inner loop controller 300 may include Schedule on lift lever 236 as described herein below.

Inner loop controller 300 may include pitch rate damping. Adding pitch rate damping with the elevators may be the least intrusive form of augmentation that has been suggested. In this scheme, the elevator input may be a sum of the pilot input (as in fully manual flight) and a component that arrests pitch rate as measured by the IMU's such as IMU 112. The scheduling on the lift lever may be such that in forward flight (with 0 assisted lift), the full damping may be active. As the lift lever rises above some value (set to 0.1), the damping rolls off so that very low airspeed behavior may be handled entirely by the attitude controller. The higher this value may be set, the more active the elevator damping will be at low-speed flight (i.e., flight with substantial assisted lift). The saturation on the damping term ensures that the pilot has some amount of control authority regardless of what the augmentation attempts to do. With this design, as with the baseline design, there may be no blending between modes required during acceleration from lift assisted flight to fully wing-borne flight. Additionally, there may be no control discontinuity as the lift fans turn off and stow.

With continued reference to FIG. 3, an alternative augmentation strategy may be to close a pitch rate loop with the control surfaces. If one chooses to use this, note that in order to avoid blending between control modes while accelerating from low-speed flight to wing-borne flight, the control system commanding the lift rotors must also be RCRH (as opposed to the nominal ACAH). An RCRH low airspeed controller potentially increases pilot workload substantially. Also note that the gains appropriate for this controller change substantially across an electric aircraft's range of cruise airspeeds (as elevator effectivity changes with dynamic pressure). Since the lift lever will be all the way down during cruise, lift lever can no longer use this signal as a proxy for airspeed. Since using airspeed as an input would introduce an additional low reliability system, the system would be forced to select constant gains that produce a stable system at all reasonable airspeeds. The resulting system would have poor performance at low airspeeds. It may be possible to approximate airspeed in cruise from knowledge of the pusher performance and the operating speed and torque. Such an estimate of airspeed would likely be sufficient to enable the scheduling of gains on airspeed, which would result in less conservative design, and higher performance. For the purposes of controlling a vehicle, the flight control system 100 are interested in the aerodynamic forces that the lift rotors can provide. However, since the aerodynamic forces and torques that the rotors generate are a function of speed, and the lift rotors have substantial inertia, simply passing the corresponding steady state torque commands to the motor will result in a slow thrust response. If this substantial phase lag may be not compensated for, performance will be severely limited. Because the flight control system 100 have a good understanding of the physics involved, the flight control system 100 can apply a dynamic inverse of the rotor model to the steady state torque signals in order to obtain better speed tracking, and therefore better thrust tracking. Intuitively, this dynamic inverse adds a "kick" forward when the incoming signal increases sharply and adds a "kick" backwards when the incoming signal decreases sharply. This may be very much the same as how the flight control system 100 accelerate a car to highway speed. Once the car may be at speed, one likely only needs one quarter throttle to maintain speed, which suggests that holding one quarter throttle for a sufficiently long time starting from a low speed would eventually accelerate the car to the desired speed. Of course, if one uses full throttle to get up to speed, and then returns to quarter throttle to hold speed, a faster response can be achieved. This may be the core idea of what the dynamic inverse does. To apply a dynamic inverse, the flight control system 100 first generate a model based on Euler's equation in 1 dimension. Here, I may be the fan inertia about the axis of rotation, \omega may be the angular velocity of the motor, \tau_{motor} may be the shaft torque generated by the motor, and \tau_{aero} may be the aerodynamic shaft torque. Because the aerodynamic term may be nonlinear in the speed state, the flight control system 100 will omit this from the dynamic inversion for simplicity and handle it separately. Eventually, the torque command that the flight control system 100 send to the motor will be a sum of a softened dynamic inverse of the motor inertia, and an approximation of the aerodynamic torque as below. First, the flight control system 100 will determine the value of the inertia dynamic inverse term. When the flight control system 100 inverts the inertia-only model (i.e. obtain the output→input response rather than the input→output response), the flight control system 100 will end up with a pure derivative, which has an infinite high frequency response, and may be thus not desirable. However, if the flight control system 100 passed a desired speed through this transfer function (given below), the resulting torque output would perfectly reproduce the desired speed. To make this work on a real system with torque limits, the flight control system 100 will add a first order low pass filter in series with the dynamic inverse sI. If the motors had unlimited torque capability, the resulting dynamics from input to motor speed would be just the low pass dynamics. Note that a motor speed command may be present in this expression. However, the flight control system 100 would like to avoid closing a speed loop on the lift motors. The decision to not close a speed loop was made on the belief that the thrust-torque relationship was more constant than the thrust-speed relationship for edgewise flight. This may be not the case; both relationships vary similarly with edgewise airspeed according to DUST simulations. This decision may be re-evaluated in the future. However, because speed may be the only state of the system, the flight control system 100 may be forced to generate some speed as input to this filter. Note that this speed does not have to be particularly accurate—there are no loops being closed on it, and this dynamic inverse decays to 0 quickly after the input signal stops changing. An appropriate means to generate this pseudo-reference speed may be to use the well-known approximation for the static speed-torque relationship for a fan: Using this relationship, the flight control system 100 can compute the approximate steady state speed that corresponds to a given torque input. Then, this speed signal may be passed through the dynamic inverse of the inertia only system. If this was the only torque that was applied to the lift motors in a vacuum (i.e., no aero drag), the lift rotors would track speeds reasonably well. Of course, this may be not the case, and the flight control system 100 must still account for the aerodynamic torque. If the flight control system 100 could always apply the exact aerodynamic torque experienced by the fan (but in the opposite sense) with the motor, any additional input would "see" only the inertia of the fan and motor. If this additional input may be the inertia-only dynamic inverse, then the flight control system 100 would obtain the desired first order low pass response in speed. Consider the following non-limiting example of bootstrapping. If the flight control system 100 assumes that the flight control system 100 has a good approximation of aerodynamic torque and motor saturation does not engage, then the motor speed response (and therefore the aero torque, approximately) will be a first order low pass filter, with time constant \tau_{ff}. This tells us that the flight control system 100 can approximate the aerodynamic torque by passing the steady state torque command through a similar first order transfer function. The combination of this filtered steady state torque and dynamic inversion of the approximated corresponding speed may be shown below. To implement this in discrete time, the transfer functions are discretized using the Tustin, or Bilinear transform. Setting \tau_{ff} and \tau_{fwd} involves simulation of the system subject to different size and direction of input changes about different operating points. These time constants are tweaked to make the fans spin up as quickly as possible over a range of inputs. Intuitively, an excessively large time constant results in a slow response. However, a very short time constant also results in a slow response. With a very short time constant, the amplitude of the initial kick from the dynamic inverse may be very large, but also very short in duration. As a result of motor saturation, the total achieved energy increase from the kick may be low. An intermediate value of time constant (set to approximately 0.13) provides a faster response than either extreme. Due to the nature of the dynamic inverse, this system amplifies noise in the steady state torque command. To avoid this becoming a nuisance while the aircraft may be grounded, the dynamic inverse term may be scheduled on the position of the lift lever in the same way as the inner loop gains, but with a lower threshold. That may be, for 0 lift lever input, there may be 0 dynamic inversion contribution. This contribution ramps up linearly to full at 5% lift lever input. This inertia compensation (or something functionally similar), which may be essentially a lead-lag filter, but with physically derived pole and zero locations, may be essential to the high-performance operation of any vehicle with slow control actuators. Without this, the phase lag introduced by the actuators makes it impossible to achieve bandwidth sufficient for satisfactory handling qualities. For well-flown transitions, the lift lever position may be a good proxy for airspeed, which directly determines the effectiveness of the conventional control surfaces. This follows from the fact that at a fixed angle of attack, dynamic pressure on the wing and unpowered lift are linearly related. Therefore, in order to maintain altitude (which a pilot would tend to do), one would need to lower the lift lever as airspeed increases. In the case that a pilot were to rapidly pull up on the lift lever not in accordance with a decrease in airspeed, a pilot's control inputs would produce more than nominal control moment on the vehicle due to lift fan gains not being scheduled down and high dynamic pressure. In simulation, this scenario has been shown to be non-catastrophic, although it will likely be somewhat violent as the vehicle accelerates upwards rapidly and experiences some attitude transients. It may be easy to understand that each motor can only output a torque between some lower limit and some upper limit. If the flight control system 100 draw the area that corresponds to these available motor commands for the 2-fan system, the flight control system 100 find that a "box" may be formed. If the flight control system 100 assume a linear torque-thrust relationship, then so long as the motors do not rotate on the body, the map from this acceptable box in the motor torque space to the acceptable box in the space where the axes are vehicle level upward thrust and torque may be linear. Therefore, the shape can only be scaled, flipped, and rotated, but straight edges remain straight, and the number of vertices cannot change. With this transformation done, the flight control system 100 can now readily determine if a particular commanded force and torque combination may be possible to achieve. Suppose that the flight control system 100 chooses to prioritize vehicle level torque over force. In the case that the force and torque combination may be inside the box, no saturation occurs— the mixer may be able to achieve the request, and no prioritization may be needed. Suppose instead that some points with the desired torque are within the box, but none of these points have the desired force. Algorithmically, the flight control system 100 first get the achieved torque to match the desired torque as closely as possible. Then, that value may be locked down, and then subject to that constraint, the flight control system 100 matches the desired thrust as closely as possible. In this case, the desired torque is achieved, but the desired thrust is not. Mathematically, this is two sequentially solved linear programs (linear objective, linear constraints). Because the flight control system 100 knew the map from motor torques to vehicle torques, and because that map is invertible, the flight control system 100 can now apply the inverse of this map to get a motor torque command 148 from the point the flight control system 100 identified in the vehicle torque space. Since the point is inside the box in the vehicle torque space, it is guaranteed to also be inside the box in the motor torque vector space, and thus guarantees that the resulting torque commands will be within the limits of the motors. Note that the flight control system 100 have not only resolved the motor saturation, the flight control system 100 also know how much force and torque the flight control system 100 are trying to produce (i.e. the flight control system 100 haven't blindly done some clipping/rescaling of the motor signals). While this example uses only two dimensions, the principle may be the same in higher dimensions. The solution method used may be slightly different than what may be shown here, but the concept may be the same. Finally, it is important to note that throughout this process, the flight control system 100 has assumed that torque corresponds to thrust. This may be only true in the case of steady state operation. Because the lift fans or one or other propulsors take a substantial amount of time to spin up, this assumption may be not necessarily accurate. As a result, the mixer's estimate of achieved moment may be not accurate for rapidly changing inputs without inertia compensation. the flight control system 100 can use a behavioral model of the lift fans or speed feedback to better approximate the true moment acting on the aircraft due to powered lift.

Figure 4:
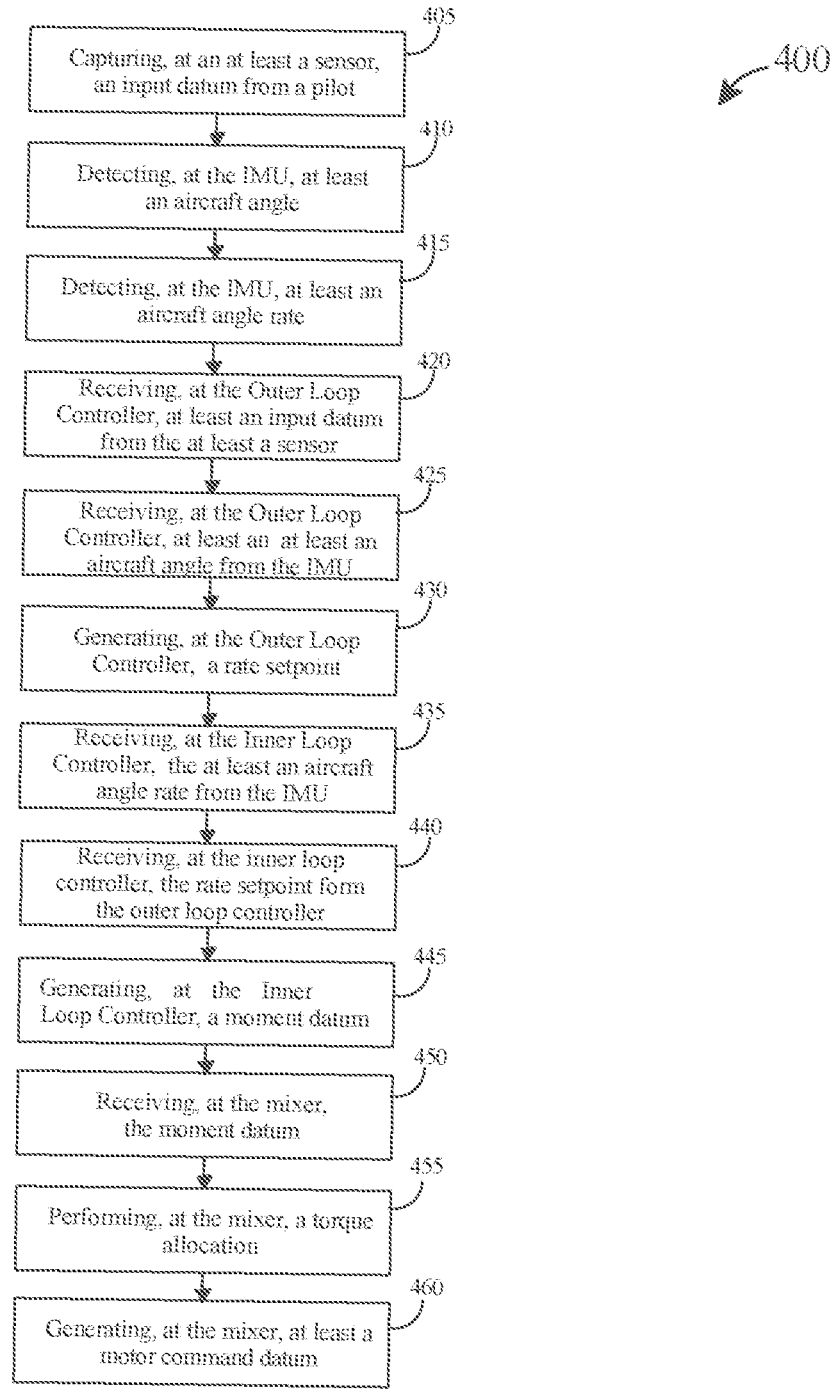
FIG. 4 is an exemplary method of an aircraft control configured for use in electric aircraft in block diagram form.

Referring now to FIG. 4, a method for flight control configured for use in electric aircraft includes, at 405, capturing, at an at least a sensor 104, an input datum 108 from a pilot. At least a sensor may be consistent with any sensor as described herein. The input datum may be consistent with any input datum as described herein. At least a sensor 104 may be mechanically and communicatively connected to a throttle. The throttle may be consistent with any throttle as described herein. At least a sensor 104 may be mechanically and communicatively connected to an inceptor stick. The inceptor stick may be consistent with any inceptor stick as described herein. At least a sensor may be mechanically and communicatively connected to at least a foot pedal. The foot pedal may be consistent with any foot pedal as described herein.

Still referring to FIG. 4, at 410, includes detecting, at the inertial measurement unit 112, at least an aircraft angle 116. The inertial measurement unit 112 may be consistent with any inertial measurement unit as described herein. At least an aircraft angle 116 may be consistent with any aircraft angle as described herein.

Still referring to FIG. 4, at 415, includes detecting, at the inertial measurement unit 412, at least an aircraft angle rate 420. At least an aircraft angle rate 420 may be consistent with any aircraft angle rate as described herein.

Still referring to FIG. 4, at 420, includes receiving, at the outer loop controller 128, at least an input datum 108 from at least a sensor 104. The outer loop controller 128 may be consistent with any outer loop controller as described herein. The input datum 108 may be consistent with any input datum as described herein. At least a sensor 104 may be consistent with any sensor as described herein. The flight controller may be implemented using a processor. The flight controller 124 may be consistent with any flight controller as described herein. The processor may be consistent with any processor as described herein.

Still referring to FIG. 4, at 425, includes receiving, at the outer loop controller 128, at least an aircraft angle 116 from the inertial measurement unit 112. The outer loop controller may be consistent with any outer loop controller as described herein. At least an aircraft angle 116 may be consistent with any aircraft angle as described herein.

Still referring to FIG. 4, at 430, includes generating, at the outer loop controller 128, a rate setpoint 132 as a function of at least an input datum 108. The outer loop controller may be any outer loop controller as described herein. The rate setpoint may be any rate setpoint as described herein. The input datum may be consistent with any input data as described herein.

Still referring to FIG. 4, at 435, includes receiving, at the inner loop controller 136, at least an aircraft angle rate 120 from the inertial measurement unit 112. The inner loop controller 136 may be consistent with any inner loop controller as described herein. The inner loop controller may include a lead-lag filter. The inner loop controller may include an integrator. At least an aircraft angle rate 120 may be any aircraft angle rate as described herein. The inertial measurement unit 112 may be consistent with any inertial measurement unit as described herein.

Still referring to FIG. 4, at 440, includes receiving, at the inner loop controller 136, the rate setpoint 132 from the outer loop controller 128. The inner loop controller 136 may be consistent with any inner loop controller as described herein. The rate setpoint 132 may be consistent with any rate setpoint as described herein. The outer loop controller 128 may be described herein.

Still referring to FIG. 4, at 445, includes receiving, at the inner loop controller 128, a moment datum 140 as a function of the rate setpoint. The inner loop controller 128 may be consistent with any inner loop controller as described herein. The moment datum 140 may consistent with any moment datum as described herein.

Still referring to FIG. 4, at 450, includes receiving, at the mixer 144, the moment datum 140. The mixer 144 may be consistent with any mixer as described herein. The moment datum 140 may be consistent with any moment datum as described herein. The mixer 144 may be implemented using an electrical logic circuit. The mixer may include an inertia compensator.

Still referring to FIG. 4, at 455, includes performing, at the mixer 144, a torque allocation as a function of the moment datum 140. The mixer 144 may be consistent with any mixer as described herein. The moment datum 140 may be consistent with any moment datum as described herein.

Still referring to FIG. 4, at 460, includes generating, at the mixer 144, at least a motor torque command datum 148 as a function of the torque allocation. The mixer 144 may be consistent with any mixer as described herein. The motor torque command datum 148 may be consistent with any motor command datum as described herein. The motor torque command datum 148 may be transmitted to a plurality of flight components. The motor torque command datum 148 may be consistent with any motor torque command datum as described herein. The flight components may be consistent with any flight components as described herein.

Figure 5:
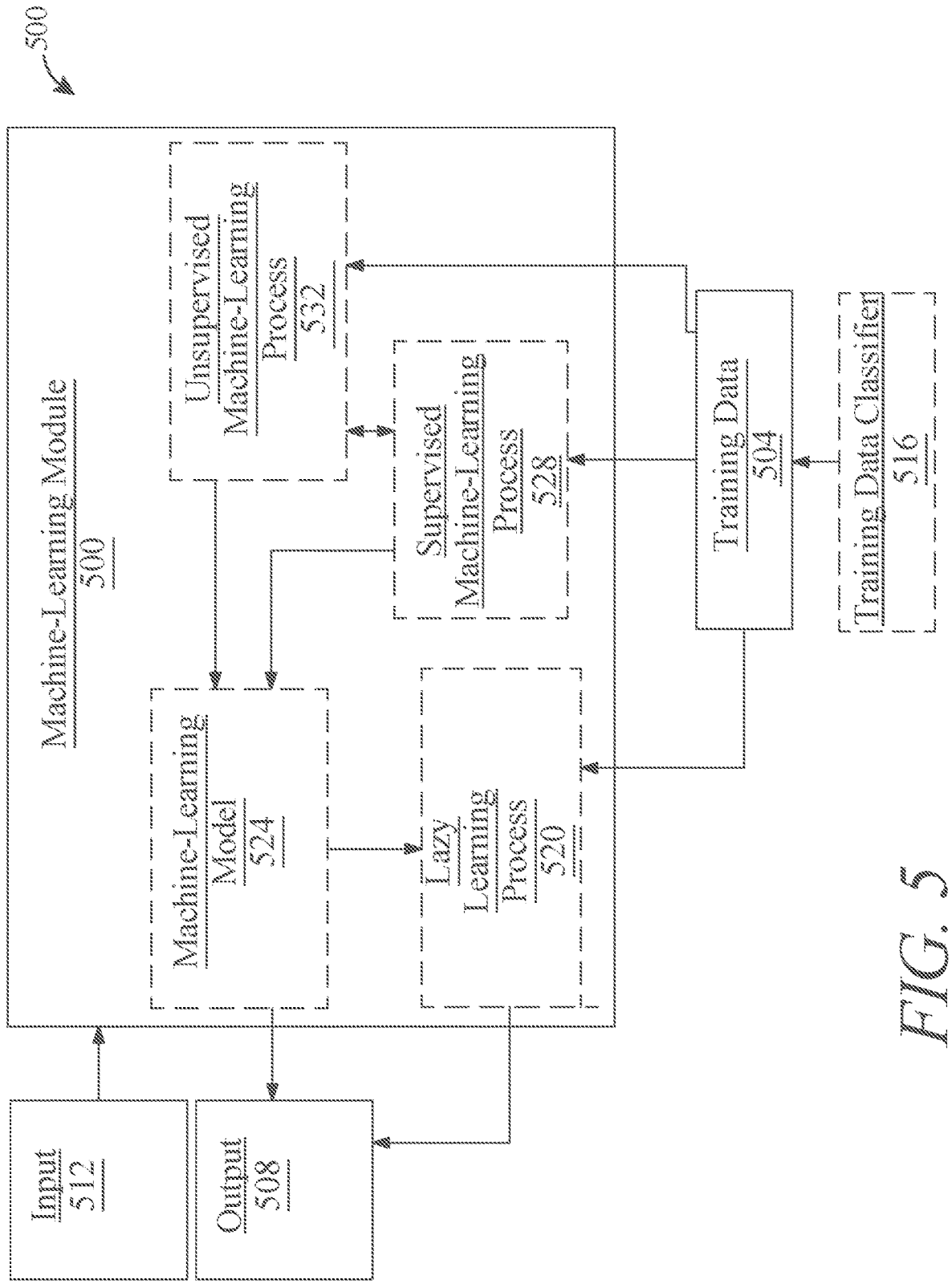
FIG. 5 is a block diagram of an exemplary embodiment of a machine learning module.

Referring now to FIG. 5, flight controller 124, outer loop controller 128, inner loop controller 136 or another computing device or model that may utilize stored data to generate any datum as described herein. Stored data may be past inconsistency datums, predictive datums, measured state datums, or the like in an embodiment of the present invention. Stored data may be input by a user, pilot, support personnel, or another. Stored data may include algorithms and machine-learning processes that may generate one or more datums associated with the herein disclosed system including input datums, moment datums, and the like. The algorithms and machine-learning processes may be any algorithm or machine-learning processes as described herein. Training data may be columns, matrices, rows, blocks, spreadsheets, books, or other suitable datastores or structures that contain correlations between past inputs datums, moment datums, or the like to motor torque commands. Training data may be any training data as described below. Training data may be past measurements detected by any sensors described herein or another sensor or suite of sensors in combination. Training data may be detected by onboard or offboard instrumentation designed to detect measured state datum or environmental conditions as described herein. Training data may be uploaded, downloaded, and/or retrieved from a server prior to flight. Training data may be generated by a computing device that may simulate input datums suitable for use by the flight controller, controller, or other computing devices in an embodiment of the present invention. Flight controller, controller, and/or another computing device as described in this disclosure may train one or more machine-learning models using the training data as described in this disclosure. Training one or more machine-learning models consistent with the training one or more machine learning modules as described in this disclosure.

With continued reference to FIG. 5, algorithms and machine-learning processes may include any algorithms or machine-learning processes as described herein. Training data may be columns, matrices, rows, blocks, spreadsheets, books, or other suitable datastores or structures that contain correlations between torque measurements to obstruction datums. Training data may be any training data as described herein. Training data may be past measurements detected by any sensors described herein or another sensor or suite of sensors in combination. Training data may be detected by onboard or offboard instrumentation designed to detect environmental conditions and measured state datums as described herein. Training data may be uploaded, downloaded, and/or retrieved from a server prior to flight. Training data may be generated by a computing device that may simulate predictive datums, performance datums, or the like suitable for use by the flight controller, controller, plant model, in an embodiment of the present invention. Flight controller, controller, and/or another computing device as described in this disclosure may train one or more machine-learning models using the training data as described in this disclosure.

Still referring to FIG. 5, an exemplary embodiment of a machine-learning module 500 that may perform one or more machine-learning processes as described in this disclosure may be illustrated. Machine-learning module may perform determinations, classification, and/or analysis steps, methods, processes, or the like as described in this disclosure using machine learning processes. A "machine learning process," as used in this disclosure, may be a process that automatedly uses training data 504 to generate an algorithm that will be performed by a computing device/module to produce outputs 508 given data provided as inputs 512; this may be in contrast to a non-machine learning software program where the commands to be executed are determined in advance by a user and written in a programming language.

Still referring to FIG. 5, "training data," as used herein, may be data containing correlations that a machine-learning process may use to model relationships between two or more categories of data elements. For instance, and without limitation, training data 504 may include a plurality of data entries, each entry representing a set of data elements that were recorded, received, and/or generated together; data elements may be correlated by shared existence in a given data entry, by proximity in a given data entry, or the like. Multiple data entries in training data 504 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 504 according to various correlations; correlations may indicate causative and/or predictive links between categories of data elements, which may be modeled as relationships such as mathematical relationships by machine-learning processes as described in further detail below. Training data 504 may be formatted and/or organized by categories of data elements, for instance by associating data elements with one or more descriptors corresponding to categories of data elements. As a non-limiting example, training data 504 may include data entered in standardized forms by persons or processes, such that entry of a given data element in a given field in a form may be mapped to one or more descriptors of categories. Elements in training data 504 may be linked to descriptors of categories by tags, tokens, or other data elements; for instance, and without limitation, training data 504 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively, or additionally, and continuing to refer to FIG. 5, training data 504 may include one or more elements that are not categorized; that may be, training data 504 may not be formatted or contain descriptors for some elements of data. Machine-learning algorithms and/or other processes may sort training data 504 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 504 to be made applicable for two or more distinct machine-learning algorithms as described in further detail below. Training data 504 used by machine-learning module 500 may correlate any input data as described in this disclosure to any output data as described in this disclosure. As a non-limiting illustrative example at least an input datum 108 and moment datum 140 may be inputs, wherein motor torque command 148 may be outputted.

Further referring to FIG. 5, training data may be filtered, sorted, and/or selected using one or more supervised and/or unsupervised machine-learning processes and/or models as described in further detail below; such models may include without limitation a training data classifier 516. Training data classifier 516 may include a "classifier," which as used in this disclosure may be a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 500 may generate a classifier using a classification algorithm, defined as a processes whereby a computing device and/or any module and/or component operating thereon derives a classifier from training data 504. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 516 may classify elements of training data to classes of deficiencies, wherein a nourishment deficiency may be categorized to a large deficiency, a medium deficiency, and/or a small deficiency.

Still referring to FIG. 5, machine-learning module 500 may be configured to perform a lazy-learning process 520 and/or protocol, which may alternatively be referred to as a "lazy loading" or "call-when-needed" process and/or protocol, may be a process whereby machine learning may be conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 504. Heuristic may include selecting some number of highest-ranking associations and/or training data 504 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 5, machine-learning processes as described in this disclosure may be used to generate machine-learning models 524. A "machine-learning model," as used in this disclosure, may be a mathematical and/or algorithmic representation of a relationship between inputs and outputs, as generated using any machine-learning process including without limitation any process as described above, and stored in memory; an input is submitted to a machine-learning model 524 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 524 may be generated by creating an artificial neural network, such as a convolutional neural network comprising an input layer of nodes, one or more intermediate layers, and an output layer of nodes. Connections between nodes may be created via the process of "training" the network, in which elements from a training data 504 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process may be sometimes referred to as deep learning.

Still referring to FIG. 5, machine-learning algorithms may include at least a supervised machine-learning process 528. At least a supervised machine-learning process 528, as defined herein, include algorithms that receive a training set relating a number of inputs to a number of outputs, and seek to find one or more mathematical relations relating inputs to outputs, where each of the one or more mathematical relations may be optimal according to some criterion specified to the algorithm using some scoring function. For instance, a supervised learning algorithm may include input datum 108 as described above as one or more inputs, moment datum 140 as an output, and a scoring function representing a desired form of relationship to be detected between inputs and outputs; scoring function may, for instance, seek to maximize the probability that a given input and/or combination of elements inputs may be associated with a given output to minimize the probability that a given input may be not associated with a given output. Scoring function may be expressed as a risk function representing an "expected loss" of an algorithm relating inputs to outputs, where loss is computed as an error function representing a degree to which a prediction generated by the relation may be incorrect when compared to a given input-output pair provided in training data 504. Persons skilled in the art, upon reviewing the entirety of this disclosure, will be aware of various possible variations of at least a supervised machine-learning process 528 that may be used to determine relation between inputs and outputs. Supervised machine-learning processes may include classification algorithms as defined above.

Further referring to FIG. 5, machine learning processes may include at least an unsupervised machine-learning processes 532. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 5, machine-learning module 500 may be designed and configured to create a machine-learning model 524 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression may be combined with multiplying the least-squares term by a factor of 1 divided by double the number of samples. Linear regression models may include a multi-task lasso model wherein the norm applied in the least-squares term of the lasso model may be the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit may be sought; similar methods to those described above may be applied to minimize error functions, as will be apparent to persons skilled in the art upon reviewing the entirety of this disclosure.

Continuing to refer to FIG. 5, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 6:
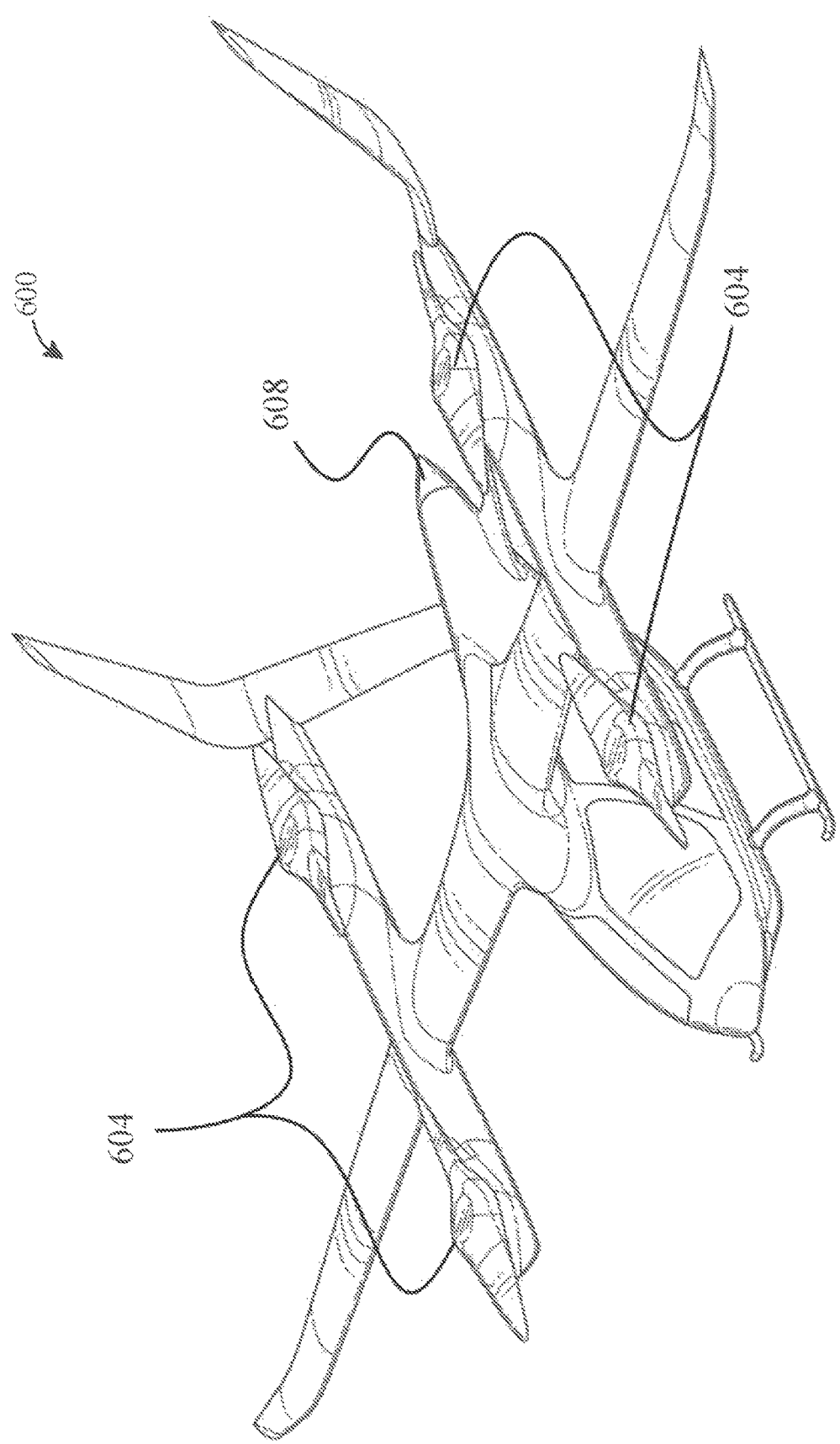
FIG. 6 is an illustration of an exemplary embodiment of an electric aircraft.

Referring now to FIG. 6, an embodiment of an electric aircraft 600 is presented. Still referring to FIG. 6, electric aircraft 600 may include a vertical takeoff and landing aircraft (eVTOL). As used herein, a vertical take-off and landing (eVTOL) aircraft may be one that can hover, take off, and land vertically. An eVTOL, as used herein, may be an electrically powered aircraft typically using an energy source, of a plurality of energy sources to power the aircraft. In order to optimize the power and energy necessary to propel the aircraft. eVTOL may be capable of rotor-based cruising flight, rotor-based takeoff, rotor-based landing, fixed-wing cruising flight, airplane-style takeoff, airplane-style landing, and/or any combination thereof. Rotor-based flight, as described herein, may be where the aircraft generated lift and propulsion by way of one or more powered rotors connected with an engine, such as a "quad copter," multi-rotor helicopter, or other vehicle that maintains its lift primarily using downward thrusting propulsors. Fixed-wing flight, as described herein, may be where the aircraft may be capable of flight using wings and/or foils that generate life caused by the aircraft's forward airspeed and the shape of the wings and/or foils, such as airplane-style flight. Control forces of the aircraft are achieved by conventional elevators, ailerons and rudders during fixed wing flight. Roll and Pitch control forces on the aircraft are achieved during transition flight by increasing and decreasing torque, and thus thrust on the four lift fans. Increasing torque on both left motors and decreasing torque on both right motors leads to a right roll, for instance. Likewise, increasing the torque on the front motors and decreasing the torque on the rear motors leads to a nose up pitching moment. Clockwise and counterclockwise turning motors torques are increased and decreased to achieve the opposite torque on the overall aircraft about the vertical axis and achieve yaw maneuverability.

With continued reference to FIG. 6, a number of aerodynamic forces may act upon the electric aircraft 600 during flight. Forces acting on an electric aircraft 600 during flight may include, without limitation, thrust, the forward force produced by the rotating element of the electric aircraft 600 and acts parallel to the longitudinal axis. Another force acting upon electric aircraft 600 may be, without limitation, drag, which may be defined as a rearward retarding force which may be caused by disruption of airflow by any protruding surface of the electric aircraft 600 such as, without limitation, the wing, rotor, and fuselage. Drag may oppose thrust and acts rearward parallel to the relative wind. A further force acting upon electric aircraft 600 may include, without limitation, weight, which may include a combined load of the electric aircraft 600 itself, crew, baggage, and/or fuel. Weight may pull electric aircraft 600 downward due to the force of gravity. An additional force acting on electric aircraft 600 may include, without limitation, lift, which may act to oppose the downward force of weight and may be produced by the dynamic effect of air acting on the airfoil and/or downward thrust from the propulsor of the electric aircraft. Lift generated by the airfoil may depend on speed of airflow, density of air, total area of an airfoil and/or segment thereof, and/or an angle of attack between air and the airfoil. For example, and without limitation, electric aircraft 600 are designed to be as lightweight as possible. Reducing the weight of the aircraft and designing to reduce the number of components may be essential to optimize the weight. To save energy, it may be useful to reduce weight of components of an electric aircraft 600, including without limitation propulsors and/or propulsion assemblies. In an embodiment, the motor may eliminate need for many external structural features that otherwise might be needed to join one component to another component. The motor may also increase energy efficiency by enabling a lower physical propulsor profile, reducing drag and/or wind resistance. This may also increase durability by lessening the extent to which drag and/or wind resistance add to forces acting on electric aircraft 600 and/or propulsors.

Referring still to FIG. 6, Aircraft may include at least a vertical propulsor 604 and at least a forward propulsor 608. A forward propulsor may be a propulsor that propels the aircraft in a forward direction. Forward in this context may be not an indication of the propulsor position on the aircraft; one or more propulsors mounted on the front, on the wings, at the rear, etc. A vertical propulsor may be a propulsor that propels the aircraft in a upward direction; one or more vertical propulsors may be mounted on the front, on the wings, at the rear, and/or any suitable location. A propulsor, as used herein, may be a component or device used to propel a craft by exerting force on a fluid medium, which may include a gaseous medium such as air or a liquid medium such as water. At least a vertical propulsor 604 may be a propulsor that generates a substantially downward thrust, tending to propel an aircraft in a vertical direction providing thrust for maneuvers such as without limitation, vertical take-off, vertical landing, hovering, and/or rotor-based flight such as "quadcopter" or similar styles of flight.

With continued reference to FIG. 6, at least a forward propulsor 608 as used in this disclosure may be a propulsor positioned for propelling an aircraft in a "forward" direction; at least a forward propulsor may include one or more propulsors mounted on the front, on the wings, at the rear, or a combination of any such positions. At least a forward propulsor may propel an aircraft forward for fixed-wing and/or "airplane"-style flight, takeoff, and/or landing, and/or may propel the aircraft forward or backward on the ground. At least a vertical propulsor 604 and at least a forward propulsor 608 includes a thrust element. At least a thrust element may include any device or component that converts the mechanical energy of a motor, for instance in the form of rotational motion of a shaft, into thrust in a fluid medium. At least a thrust element may include, without limitation, a device using moving or rotating foils, including without limitation one or more rotors, an airscrew or propeller, a set of airscrews or propellers such as contrarotating propellers, a moving or flapping wing, or the like. At least a thrust element may include without limitation a marine propeller or screw, an impeller, a turbine, a pump-jet, a paddle or paddle-based device, or the like. As another non-limiting example, at least a thrust element may include an eight-bladed pusher propeller, such as an eight-bladed propeller mounted behind the engine to ensure the drive shaft may be in compression. Propulsors may include at least a motor mechanically connected to at least a first propulsor as a source of thrust. A motor may include without limitation, any electric motor, where an electric motor may be a device that converts electrical energy into mechanical energy, for instance by causing a shaft to rotate. At least a motor may be driven by direct current (DC) electric power; for instance, at least a first motor may include a brushed DC at least a first motor, or the like. At least a first motor may be driven by electric power having varying or reversing voltage levels, such as alternating current (AC) power as produced by an alternating current generator and/or inverter, or otherwise varying power, such as produced by a switching power source. At least a first motor may include, without limitation, brushless DC electric motors, permanent magnet synchronous at least a first motor, switched reluctance motors, or induction motors. In addition to inverter and/or a switching power source, a circuit driving at least a first motor may include electronic speed controllers or other components for regulating motor speed, rotation direction, and/or dynamic braking. Persons skilled in the art, upon reviewing the entirety of this disclosure, will be aware of various devices that may be used as at least a thrust element.

With continued reference to FIG. 6, during flight, a number of forces may act upon the electric aircraft. Forces acting on an aircraft 600 during flight may include thrust, the forward force produced by the rotating element of the aircraft 600 and acts parallel to the longitudinal axis. Drag may be defined as a rearward retarding force which may be caused by disruption of airflow by any protruding surface of the aircraft 600 such as, without limitation, the wing, rotor, and fuselage. Drag may oppose thrust and acts rearward parallel to the relative wind. Another force acting on aircraft 600 may include weight, which may include a combined load of the aircraft 600 itself, crew, baggage and fuel. Weight may pull aircraft 600 downward due to the force of gravity. An additional force acting on aircraft 600 may include lift, which may act to oppose the downward force of weight and may be produced by the dynamic effect of air acting on the airfoil and/or downward thrust from at least a propulsor. Lift generated by the airfoil may depends on speed of airflow, density of air, total area of an airfoil and/or segment thereof, and/or an angle of attack between air and the airfoil.

With continued reference to FIG. 6, at least a portion of an electric aircraft may include at least a propulsor. A propulsor, as used herein, may be a component or device used to propel a craft by exerting force on a fluid medium, which may include a gaseous medium such as air or a liquid medium such as water. In an embodiment, when a propulsor twists and pulls air behind it, it will, at the same time, push an aircraft forward with an equal amount of force. The more air pulled behind an aircraft, the greater the force with which the aircraft may be pushed forward. Propulsor may include any device or component that consumes electrical power on demand to propel an electric aircraft in a direction or other vehicle while on ground or in-flight.

With continued reference to FIG. 6, in an embodiment, at least a portion of the aircraft may include a propulsor, the propulsor may include a propeller, a blade, or any combination of the two. The function of a propeller may be to convert rotary motion from an engine or other power source into a swirling slipstream which pushes the propeller forwards or backwards. The propulsor may include a rotating power-driven hub, to which are attached several radial airfoil-section blades such that the whole assembly rotates about a longitudinal axis. The blade pitch of the propellers may, for example, be fixed, manually variable to a few set positions, automatically variable (e.g. a "constant-speed" type), or any combination thereof. In an embodiment, propellers for an aircraft are designed to be fixed to their hub at an angle similar to the thread on a screw makes an angle to the shaft; this angle may be referred to as a pitch or pitch angle which will determine the speed of the forward movement as the blade rotates.

With continued reference to FIG. 6, in an embodiment, a propulsor can include a thrust element which may be integrated into the propulsor. The thrust element may include, without limitation, a device using moving or rotating foils, such as one or more rotors, an airscrew or propeller, a set of airscrews or propellers such as contra-rotating propellers, a moving or flapping wing, or the like. Further, a thrust element, for example, can include without limitation a marine propeller or screw, an impeller, a turbine, a pump-jet, a paddle or paddle-based device, or the like.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Figure 7:
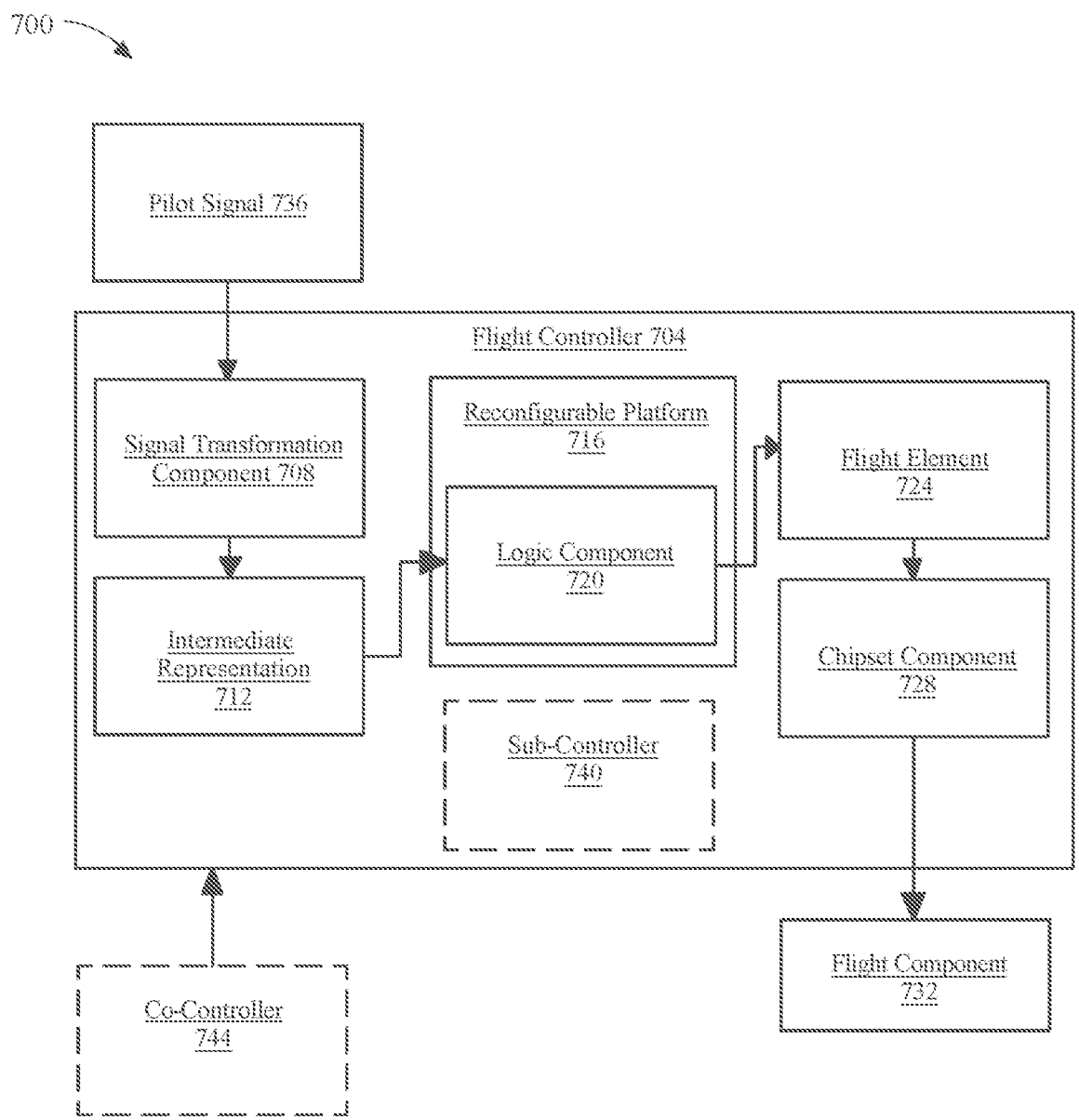
FIG. 7 is an illustrative embodiment of a flight controller.

Now referring to FIG. 7, an exemplary embodiment 700 of a flight controller 704 is illustrated. As used in this disclosure a "flight controller" is a computing device of a plurality of computing devices dedicated to data storage, security, distribution of traffic for load balancing, and flight instruction. Flight controller 704 may include and/or communicate with any computing device as described in this disclosure, including without limitation a microcontroller, microprocessor, digital signal processor (DSP) and/or system on a chip (SoC) as described in this disclosure. Further, flight controller 704 may include a single computing device operating independently, or may include two or more computing device operating in concert, in parallel, sequentially or the like; two or more computing devices may be included together in a single computing device or in two or more computing devices. In embodiments, flight controller 704 may be installed in an aircraft, may control the aircraft remotely, and/or may include an element installed in the aircraft and a remote element in communication therewith.

In an embodiment, and still referring to FIG. 7, flight controller 704 may include a signal transformation component 708. As used in this disclosure a "signal transformation component" is a component that transforms and/or converts a first signal to a second signal, wherein a signal may include one or more digital and/or analog signals. For example, and without limitation, signal transformation component 708 may be configured to perform one or more operations such as preprocessing, lexical analysis, parsing, semantic analysis, and the like thereof. In an embodiment, and without limitation, signal transformation component 708 may include one or more analog-to-digital convertors that transform a first signal of an analog signal to a second signal of a digital signal. For example, and without limitation, an analog-to-digital converter may convert an analog input signal to a 10-bit binary digital representation of that signal. In another embodiment, signal transformation component 708 may include transforming one or more low-level languages such as, but not limited to, machine languages and/or assembly languages. For example, and without limitation, signal transformation component 708 may include transforming a binary language signal to an assembly language signal. In an embodiment, and without limitation, signal transformation component 708 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

Still referring to FIG. 7, signal transformation component 708 may be configured to optimize an intermediate representation 712. As used in this disclosure an "intermediate representation" is a data structure and/or code that represents the input signal. Signal transformation component 708 may optimize intermediate representation as a function of a data-flow analysis, dependence analysis, alias analysis, pointer analysis, escape analysis, and the like thereof. In an embodiment, and without limitation, signal transformation component 708 may optimize intermediate representation 712 as a function of one or more inline expansions, dead code eliminations, constant propagation, loop transformations, and/or automatic parallelization functions. In another embodiment, signal transformation component 708 may optimize intermediate representation as a function of a machine dependent optimization such as a peephole optimization, wherein a peephole optimization may rewrite short sequences of code into more efficient sequences of code. Signal transformation component 708 may optimize intermediate representation to generate an output language, wherein an "output language," as used herein, is the native machine language of flight controller 704. For example, and without limitation, native machine language may include one or more binary and/or numerical languages.

In an embodiment, and without limitation, signal transformation component 708 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field F with q elements; strings so encoded have a minimum hamming distance of k+1, and permit correction of (q−k−1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and still referring to FIG. 7, flight controller 704 may include a reconfigurable hardware platform 716. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 716 may be reconfigured to enact any algorithm and/or algorithm selection process received from another computing device and/or created using machine-learning processes.

Still referring to FIG. 7, reconfigurable hardware platform 716 may include a logic component 720. As used in this disclosure a "logic component" is a component that executes instructions on output language. For example, and without limitation, logic component may perform basic arithmetic, logic, controlling, input/output operations, and the like thereof. Logic component 720 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 720 may be organized according to Von Neumann and/or Harvard architecture as a non-limiting example. Logic component 720 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC). In an embodiment, logic component 720 may include one or more integrated circuit microprocessors, which may contain one or more central processing units, central processors, and/or main processors, on a single metal-oxide-semiconductor chip. Logic component 720 may be configured to execute a sequence of stored instructions to be performed on the output language and/or intermediate representation 712. Logic component 720 may be configured to fetch and/or retrieve the instruction from a memory cache, wherein a "memory cache," as used in this disclosure, is a stored instruction set on flight controller 704. Logic component 720 may be configured to decode the instruction retrieved from the memory cache to opcodes and/or operands. Logic component 720 may be configured to execute the instruction on intermediate representation 712 and/or output language. For example, and without limitation, logic component 720 may be configured to execute an addition operation on intermediate representation 712 and/or output language.

In an embodiment, and without limitation, logic component 720 may be configured to calculate a flight element 724. As used in this disclosure a "flight element" is an element of datum denoting a relative status of aircraft. For example, and without limitation, flight element 724 may denote one or more torques, thrusts, airspeed velocities, forces, altitudes, groundspeed velocities, directions during flight, directions facing, forces, orientations, and the like thereof. For example, and without limitation, flight element 724 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 724 may denote that aircraft is following a flight path accurately and/or sufficiently.

Still referring to FIG. 7, flight controller 704 may include a chipset component 728. As used in this disclosure a "chipset component" is a component that manages data flow. In an embodiment, and without limitation, chipset component 728 may include a northbridge data flow path, wherein the northbridge dataflow path may manage data flow from logic component 720 to a high-speed device and/or component, such as a RAM, graphics controller, and the like thereof. In another embodiment, and without limitation, chipset component 728 may include a southbridge data flow path, wherein the southbridge dataflow path may manage data flow from logic component 720 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally or alternatively, chipset component 728 may manage data flow between logic component 720, memory cache, and a flight component 732. As used in this disclosure a "flight component" is a portion of an aircraft that can be moved or adjusted to affect one or more flight elements. For example, flight component 732 may include a component used to affect the aircrafts' roll and pitch which may comprise one or more ailerons. As a further example, flight component 732 may include a rudder to control yaw of an aircraft. In an embodiment, chipset component 728 may be configured to communicate with a plurality of flight components as a function of flight element 724. For example, and without limitation, chipset component 728 may transmit to an aircraft rotor to reduce torque of a first lift propulsor and increase the forward thrust produced by a pusher component to perform a flight maneuver.

In an embodiment, and still referring to FIG. 7, flight controller 704 may be configured generate an autonomous function. As used in this disclosure an "autonomous function" is a mode and/or function of flight controller 704 that controls aircraft automatically. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element 724. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that flight controller 704 will adjust the aircraft. As used in this disclosure a "semi-autonomous mode" is a mode that automatically adjusts and/or controls a portion and/or section of aircraft. For example, and without limitation, semi-autonomous mode may denote that a pilot will control the propulsors, wherein flight controller 704 will control the ailerons and/or rudders. As used in this disclosure "non-autonomous mode" is a mode that denotes a pilot will control aircraft and/or maneuvers of aircraft in its entirety.

In an embodiment, and still referring to FIG. 7, flight controller 704 may generate autonomous function as a function of an autonomous machine-learning model. As used in this disclosure an "autonomous machine-learning model" is a machine-learning model to produce an autonomous function output given flight element 724 and a pilot signal 736 as inputs; this is in contrast to a non-machine learning software program where the commands to be executed are determined in advance by a user and written in a programming language. As used in this disclosure a "pilot signal" is an element of datum representing one or more functions a pilot is controlling and/or adjusting. For example, pilot signal 736 may denote that a pilot is controlling and/or maneuvering ailerons, wherein the pilot is not in control of the rudders and/or propulsors. In an embodiment, pilot signal 736 may include an implicit signal and/or an explicit signal. For example, and without limitation, pilot signal 736 may include an explicit signal, wherein the pilot explicitly states there is a lack of control and/or desire for autonomous function. As a further non-limiting example, pilot signal 736 may include an explicit signal directing flight controller 704 to control and/or maintain a portion of aircraft, a portion of the flight plan, the entire aircraft, and/or the entire flight plan. As a further non-limiting example, pilot signal 736 may include an implicit signal, wherein flight controller 704 detects a lack of control such as by a malfunction, torque alteration, flight path deviation, and the like thereof. In an embodiment, and without limitation, pilot signal 736 may include one or more explicit signals to reduce torque, and/or one or more implicit signals that torque may be reduced due to reduction of airspeed velocity. In an embodiment, and without limitation, pilot signal 736 may include one or more local and/or global signals. For example, and without limitation, pilot signal 736 may include a local signal that is transmitted by a pilot and/or crew member. As a further non-limiting example, pilot signal 736 may include a global signal that is transmitted by air traffic control and/or one or more remote users that are in communication with the pilot of aircraft. In an embodiment, pilot signal 736 may be received as a function of a tri-state bus and/or multiplexor that denotes an explicit pilot signal should be transmitted prior to any implicit or global pilot signal.

Still referring to FIG. 7, autonomous machine-learning model may include one or more autonomous machine-learning processes such as supervised, unsupervised, or reinforcement machine-learning processes that flight controller 704 and/or a remote device may or may not use in the generation of autonomous function. As used in this disclosure "remote device" is an external device to flight controller 704. Additionally or alternatively, autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 7, autonomous machine learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that includes a semi-autonomous mode to increase thrust of the propulsors. Autonomous training data may be received as a function of user-entered valuations of flight elements, pilot signals, simulation data, and/or autonomous functions. Flight controller 704 may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot signal, and/or simulation data to an autonomous function. Autonomous training data may be received in the form of one or more user-entered correlations of a flight element, pilot signal, and/or simulation data to an autonomous function.

Still referring to FIG. 7, flight controller 704 may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor and the like thereof. Remote device and/or FPGA may perform the autonomous machine-learning process using autonomous training data to generate autonomous function and transmit the output to flight controller 704. Remote device and/or FPGA may transmit a signal, bit, datum, or parameter to flight controller 704 that at least relates to autonomous function. Additionally or alternatively, the remote device and/or FPGA may provide an updated machine-learning model. For example, and without limitation, an updated machine-learning model may be comprised of a firmware update, a software update, an autonomous machine-learning process correction, and the like thereof. As a non-limiting example a software update may incorporate a new simulation data that relates to a modified flight element. Additionally or alternatively, the updated machine learning model may be transmitted to the remote device and/or FPGA, wherein the remote device and/or FPGA may replace the autonomous machine-learning model with the updated machine-learning model and generate the autonomous function as a function of the flight element, pilot signal, and/or simulation data using the updated machine-learning model. The updated machine-learning model may be transmitted by the remote device and/or FPGA and received by flight controller 704 as a software update, firmware update, or corrected autonomous machine-learning model. For example, and without limitation autonomous machine learning model may utilize a neural net machine-learning process, wherein the updated machine-learning model may incorporate a gradient boosting machine-learning process.

Still referring to FIG. 7, flight controller 704 may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 7, flight controller 704 may include, but is not limited to, for example, a cluster of flight controllers in a first location and a second flight controller or cluster of flight controllers in a second location. Flight controller 704 may include one or more flight controllers dedicated to data storage, security, distribution of traffic for load balancing, and the like. Flight controller 704 may be configured to distribute one or more computing tasks as described below across a plurality of flight controllers, which may operate in parallel, in series, redundantly, or in any other manner used for distribution of tasks or memory between computing devices. For example, and without limitation, flight controller 704 may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Massachusetts, USA. In an embodiment, and without limitation, control algorithm may be configured to generate an auto-code, wherein an "auto-code," is used herein, is a code and/or algorithm that is generated as a function of the one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

In an embodiment, and still referring to FIG. 7, control algorithm may be configured to determine a segmentation boundary as a function of segmented control algorithm. As used in this disclosure a "segmentation boundary" is a limit and/or delineation associated with the segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component 732. In an embodiment, control algorithm may be configured to create an optimized signal communication as a function of segmentation boundary. For example, and without limitation, optimized signal communication may include identifying the discrete timing required to transmit and/or receive the one or more segmentation boundaries. In an embodiment, and without limitation, creating optimized signal communication further comprises separating a plurality of signal codes across the plurality of flight controllers. For example, and without limitation the plurality of flight controllers may include one or more formal networks, wherein formal networks transmit data along an authority chain and/or are limited to task-related communications. As a further non-limiting example, communication network may include informal networks, wherein informal networks transmit data in any direction. In an embodiment, and without limitation, the plurality of flight controllers may include a chain path, wherein a "chain path," as used herein, is a linear communication path comprising a hierarchy that data may flow through. In an embodiment, and without limitation, the plurality of flight controllers may include an all-channel path, wherein an "all-channel path," as used herein, is a communication path that is not restricted to a particular direction. For example, and without limitation, data may be transmitted upward, downward, laterally, and the like thereof. In an embodiment, and without limitation, the plurality of flight controllers may include one or more neural networks that assign a weighted value to a transmitted datum. For example, and without limitation, a weighted value may be assigned as a function of one or more signals denoting that a flight component is malfunctioning and/or in a failure state.

Still referring to FIG. 7, the plurality of flight controllers may include a master bus controller. As used in this disclosure a "master bus controller" is one or more devices and/or components that are connected to a bus to initiate a direct memory access transaction, wherein a bus is one or more terminals in a bus architecture. Master bus controller may communicate using synchronous and/or asynchronous bus control protocols. In an embodiment, master bus controller may include flight controller 704. In another embodiment, master bus controller may include one or more universal asynchronous receiver-transmitters (UART). For example, and without limitation, master bus controller may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or the master bus controller. In an embodiment, master bus controller may be configured to perform bus arbitration. As used in this disclosure "bus arbitration" is method and/or scheme to prevent multiple buses from attempting to communicate with and/or connect to master bus controller. For example and without limitation, bus arbitration may include one or more schemes such as a small computer interface system, wherein a small computer interface system is a set of standards for physical connecting and transferring data between peripheral devices and master bus controller by defining commands, protocols, electrical, optical, and/or logical interfaces. In an embodiment, master bus controller may receive intermediate representation 712 and/or output language from logic component 720, wherein output language may include one or more analog-to-digital conversions, low bit rate transmissions, message encryptions, digital signals, binary signals, logic signals, analog signals, and the like thereof described above in detail.

Still referring to FIG. 7, master bus controller may communicate with a slave bus. As used in this disclosure a "slave bus" is one or more peripheral devices and/or components that initiate a bus transfer. For example, and without limitation, slave bus may receive one or more controls and/or asymmetric communications from master bus controller, wherein slave bus transfers data stored to master bus controller. In an embodiment, and without limitation, slave bus may include one or more internal buses, such as but not limited to a/an internal data bus, memory bus, system bus, front-side bus, and the like thereof. In another embodiment, and without limitation, slave bus may include one or more external buses such as external flight controllers, external computers, remote devices, printers, aircraft computer systems, flight control systems, and the like thereof.

In an embodiment, and still referring to FIG. 7, control algorithm may optimize signal communication as a function of determining one or more discrete timings. For example, and without limitation master bus controller may synchronize timing of the segmented control algorithm by injecting high priority timing signals on a bus of the master bus control. As used in this disclosure a "high priority timing signal" is information denoting that the information is important. For example, and without limitation, high priority timing signal may denote that a section of control algorithm is of high priority and should be analyzed and/or transmitted prior to any other sections being analyzed and/or transmitted. In an embodiment, high priority timing signal may include one or more priority packets. As used in this disclosure a "priority packet" is a formatted unit of data that is communicated between the plurality of flight controllers. For example, and without limitation, priority packet may denote that a section of control algorithm should be used and/or is of greater priority than other sections.

Still referring to FIG. 7, flight controller 704 may also be implemented using a "shared nothing" architecture in which data is cached at the worker, in an embodiment, this may enable scalability of aircraft and/or computing device. Flight controller 704 may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers. In an embodiment, distributed flight control may include one or more neural networks. For example, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 7, a node may include, without limitation a plurality of inputs xi that may receive numerical values from inputs to a neural network containing the node and/or from other nodes. Node may perform a weighted sum of inputs using weights wi that are multiplied by respective inputs xi. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight wi applied to an input xi may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights wi may be determined by training a neural network using training data, which may be performed using any suitable process as described above. In an embodiment, and without limitation, a neural network may receive semantic units as inputs and output vectors representing such semantic units according to weights wi that are derived using machine-learning processes as described in this disclosure.

Still referring to FIG. 7, flight controller may include a sub-controller 740. As used in this disclosure a "sub-controller" is a controller and/or component that is part of a distributed controller as described above; for instance, flight controller 704 may be and/or include a distributed flight controller made up of one or more sub-controllers. For example, and without limitation, sub-controller 740 may include any controllers and/or components thereof that are similar to distributed flight controller and/or flight controller as described above. Sub-controller 740 may include any component of any flight controller as described above. Sub-controller 740 may be implemented in any manner suitable for implementation of a flight controller as described above. As a further non-limiting example, sub-controller 740 may include one or more processors, logic components and/or computing devices capable of receiving, processing, and/or transmitting data across the distributed flight controller as described above. As a further non-limiting example, sub-controller 740 may include a controller that receives a signal from a first flight controller and/or first distributed flight controller component and transmits the signal to a plurality of additional sub-controllers and/or flight components.

Still referring to FIG. 7, flight controller may include a co-controller 744. As used in this disclosure a "co-controller" is a controller and/or component that joins flight controller 704 as components and/or nodes of a distributer flight controller as described above. For example, and without limitation, co-controller 744 may include one or more controllers and/or components that are similar to flight controller 704. As a further non-limiting example, co-controller 744 may include any controller and/or component that joins flight controller 704 to distributer flight controller. As a further non-limiting example, co-controller 744 may include one or more processors, logic components and/or computing devices capable of receiving, processing, and/or transmitting data to and/or from flight controller 704 to distributed flight control system. Co-controller 744 may include any component of any flight controller as described above. Co-controller 744 may be implemented in any manner suitable for implementation of a flight controller as described above.

In an embodiment, and with continued reference to FIG. 7, flight controller 704 may be designed and/or configured to perform any method, method step, or sequence of method steps in any embodiment described in this disclosure, in any order and with any degree of repetition. For instance, flight controller 704 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
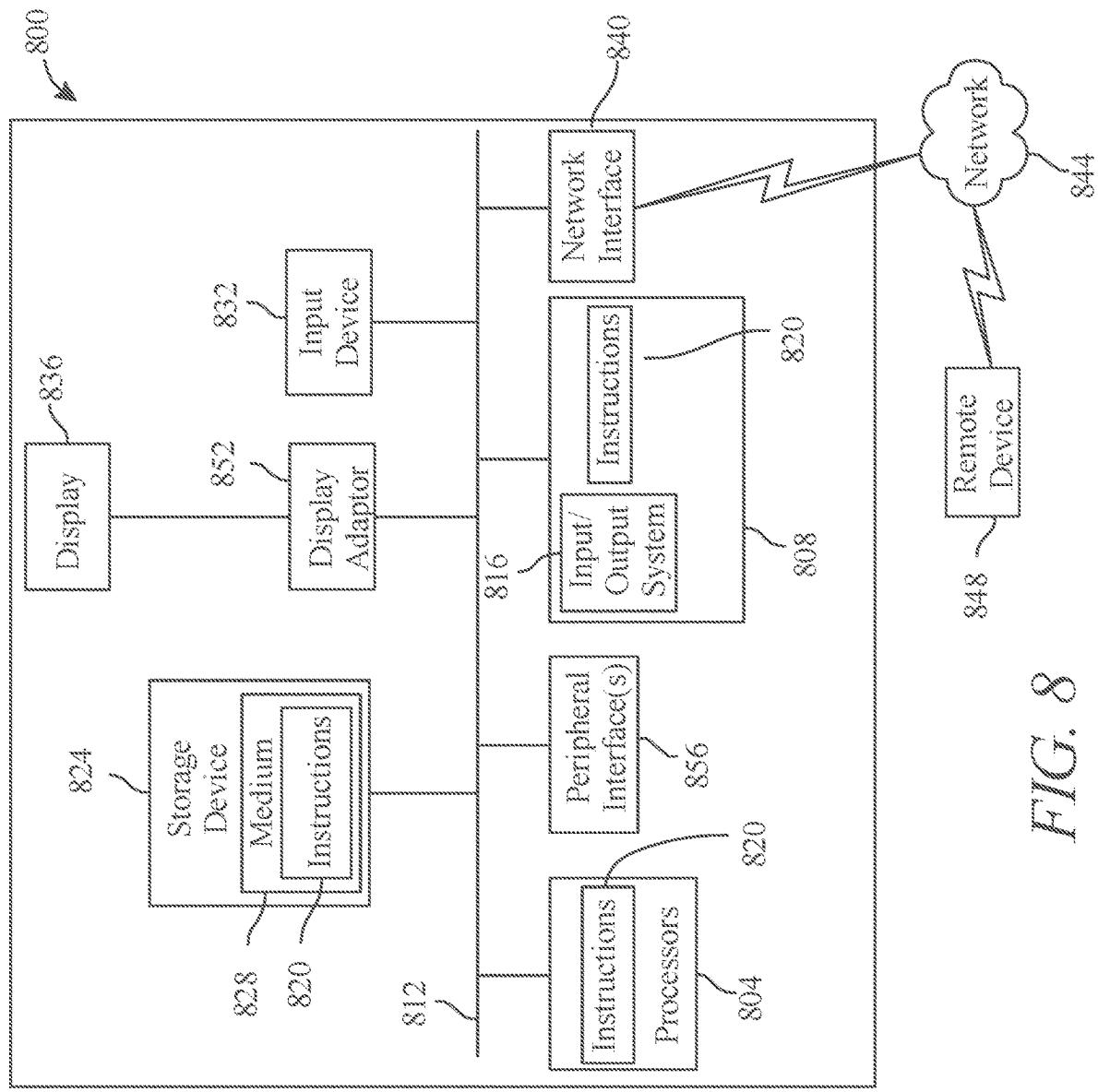
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC)

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for flight control configured for use in an electric aircraft, the system comprising:
   at least one sensor attached to at least one flight component and configured to detect signal datum from the at least one flight component;
   an inertial measurement unit, the inertial measurement unit configured to:
   detect at least an aircraft angle; and
   detect at least an aircraft angle rate; and
   a flight controller configured to generate an autonomous function, the flight controller comprising:
   an outer loop controller, the outer loop controller configured to:
   receive at least an input datum;
   receive at least the aircraft angle from the inertial measurement unit; and
   generate a rate setpoint as a function of at least the input datum;

an inner loop controller, the inner loop controller configured to:
  receive at least the aircraft angle rate;
  receive the rate setpoint from the outer loop controller; and
  generate a moment datum as a function of the rate setpoint; and
a mixer, the mixer configured to:
  receive the moment datum from the inner loop controller;
  receive the signal datum from the at least one sensor;
  perform a torque allocation as a function of the moment datum and the signal datum; and
  generate at least a motor command datum as a function of the torque allocation.

2. The system of claim 1, wherein the system further comprises a remote device, wherein the remote device is configured to transmit the at least the input datum to the flight controller.

3. The system of claim 2, wherein the remote device is one of a controller or a remote pilot control.

4. The system of claim 1, wherein, the motor command datum is provided as feedback datum to one or more of the outer loop controller or the inner loop controller.

5. The system of claim 1, wherein the flight controller further comprises a processor.

6. The system of claim 1, wherein the mixer further comprises a logic circuit.

7. The system of claim 1, wherein the mixer further comprises an inertia compensator.

8. The system of claim 1, wherein the inner loop controller further comprises a lead-lag filter.

9. The system of claim 1, wherein the inner loop controller further comprises an integrator.

10. The system of claim 1, wherein the motor command datum is transmitted to a plurality of flight components.

11. A method of flight control configured for use in electric aircraft, the method comprising:
  detecting, by at least one sensor attached to at least one flight component, signal datum;
  detecting, at an inertial measurement unit, at least an aircraft angle;
  detecting, at the inertial measurement unit, at least an aircraft angle rate;
  receiving, at a flight controller configured to generate an autonomous function, at least an input datum;
  receiving, at the flight controller, at least the aircraft angle from the inertial measurement unit;
  generating, at the flight controller, a rate setpoint as a function of at least the input datum;
  receiving, at the flight controller, at least the aircraft angle rate from the inertial measurement unit;
  generating, at the flight controller, a moment datum as a function of the rate setpoint;
  receiving, at a mixer of the flight controller, the moment datum;
  receiving, at the mixer, the signal datum;
  performing, at the mixer, a torque allocation as a function of the moment datum and the signal datum; and
  generating, at the mixer, at least a motor command datum as a function of the torque allocation.

12. The method of claim 11, wherein the method further comprises transmitting, by a remote device, the at least the input datum to the flight controller.

13. The method of claim 12, wherein the remote device is one of a controller or a remote pilot control.

14. The method of claim 11, wherein the motor command datum is provided as feedback datum to one or more of an outer loop controller or an inner loop control.

15. The method of claim 11, wherein the flight controller is implemented using a processor.

16. The method of claim 11, wherein the mixer is implemented using an electrical logic circuit.

17. The method of claim 11, wherein the mixer comprises an inertia compensator.

18. The method of claim 11, wherein the flight controller includes an inner loop controller.

19. The method of claim 11, wherein the flight controller includes an outer loops controller.

20. The method of claim 11, wherein the motor command datum is transmitted to a plurality of flight components.

21. The system of claim 1, wherein the input datum represents a desired change in a trajectory associated with the electric aircraft.

22. The system of claim 1, wherein the input datum represents a pilot input.

* * * * *